United States Patent
Gergek

(10) Patent No.: US 10,398,098 B2
(45) Date of Patent: *Sep. 3, 2019

(54) POTTED PLANT SYSTEM

(71) Applicant: Franc Gergek, Quebec (CA)

(72) Inventor: Franc Gergek, Quebec (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/943,222

(22) Filed: Apr. 2, 2018

(65) Prior Publication Data

US 2018/0228100 A1    Aug. 16, 2018

Related U.S. Application Data

(63) Continuation-in-part of application No. 15/286,293, filed on Oct. 5, 2016, now Pat. No. 9,930,840.

(51) Int. Cl.
| | | |
|---|---|---|
| *A01G 27/00* | (2006.01) | |
| *A01G 27/02* | (2006.01) | |
| *A01G 27/04* | (2006.01) | |
| *A01G 27/06* | (2006.01) | |
| *A01G 9/02*  | (2018.01) | |
| *A01G 25/14* | (2006.01) | |

(52) U.S. Cl.
CPC ......... *A01G 27/003* (2013.01); *A01G 27/008* (2013.01); *A01G 27/02* (2013.01); *A01G 27/04* (2013.01); *A01G 27/06* (2013.01); *A01G 9/024* (2013.01); *A01G 9/027* (2013.01); *A01G 25/14* (2013.01)

(58) Field of Classification Search
CPC .... A01G 27/00; A01G 27/005; A01G 27/008; A01G 27/02; A01G 27/04; A01G 27/06
USPC ................................................. 47/79, 81, 82
See application file for complete search history.

(56) References Cited

U.S. PATENT DOCUMENTS

| | | | |
|---|---|---|---|
| 3,753,315 A | 8/1973 | Adam | |
| 3,990,179 A | 11/1976 | Johnson | |
| 4,083,147 A | 4/1978 | Garrick | |
| 4,102,081 A | 7/1978 | Morrow | |
| 4,885,870 A | 12/1989 | Fong | |
| 4,993,186 A | 2/1991 | Immonen | |
| 5,446,994 A | 9/1995 | Chou | |
| 5,546,700 A * | 8/1996 | Kumpf | A01G 27/02 47/65.5 |
| 5,782,035 A | 7/1998 | Locke | |
| 5,829,193 A | 11/1998 | Otake | |

(Continued)

*Primary Examiner* — David J Parsley
(74) *Attorney, Agent, or Firm* — Cherskov Flaynik & Gurda, LLC

(57) ABSTRACT

The potted plant system of the present invention uses the space between the inner and outer pots as a reservoir for water. The water reservoir acts passively to transport water into the spoil of the inner pot which is subsequently used by the potted house plant. The reservoir is filled by over watering the inner pot and allowing the excess water to pass through the apertures within the inner pot. Passive transport of water from the reservoir to the soil occurs as the water saturation of the soil decreases. As a result, the soil and the potted plant remain hydrated for longer period of time as the reservoir continuously replenishes the water. The water within the reservoir can be drained through a quick connect sliding valve located on the outer pot. The quick connect sliding valve is either placed above another water receptacle or is fitted with a hose that transports the water to a drain.

12 Claims, 40 Drawing Sheets

(56) References Cited

U.S. PATENT DOCUMENTS

| | | | |
|---|---|---|---|
| 5,992,092 A * | 11/1999 | Furuta | A01G 27/003 47/62 E |
| 6,276,090 B1 | 8/2001 | Lai | |
| 6,363,658 B1 | 4/2002 | Lai | |
| 6,418,664 B1 | 7/2002 | Shaw | |
| 6,729,070 B1 | 5/2004 | Locke | |
| 8,065,834 B2 | 11/2011 | Eckert | |
| 8,146,292 B2 | 4/2012 | Brandstatter | |
| 9,009,885 B2 | 4/2015 | Faasse | |
| 9,930,840 B1 * | 4/2018 | Gergek | A01G 27/02 |
| 2008/0141587 A1 * | 6/2008 | Guthrie | A01G 9/028 47/86 |
| 2013/0291435 A1 | 11/2013 | Gettig | |
| 2015/0096228 A1 | 4/2015 | Watson | |

\* cited by examiner

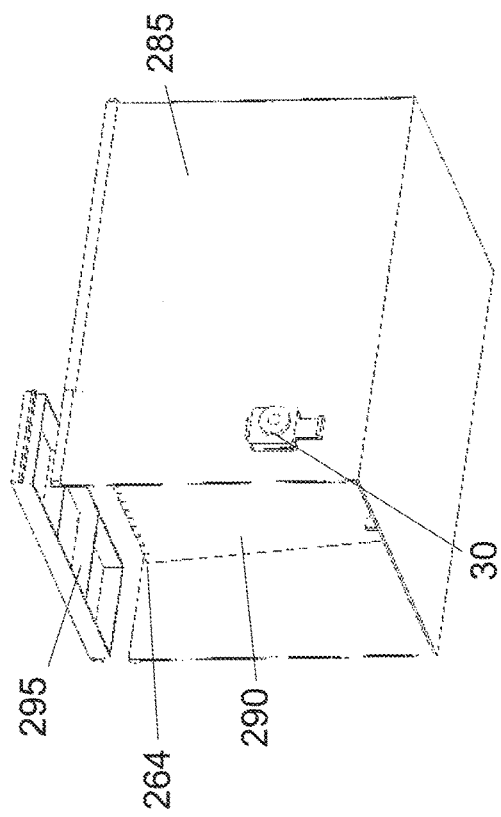
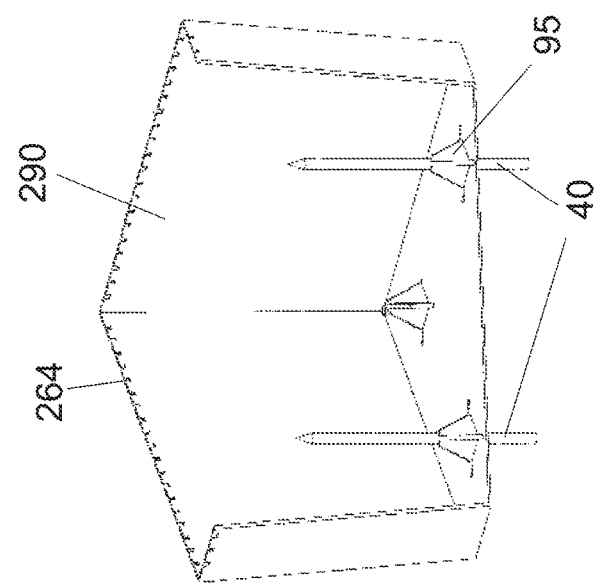
Figure 18
Figure 17

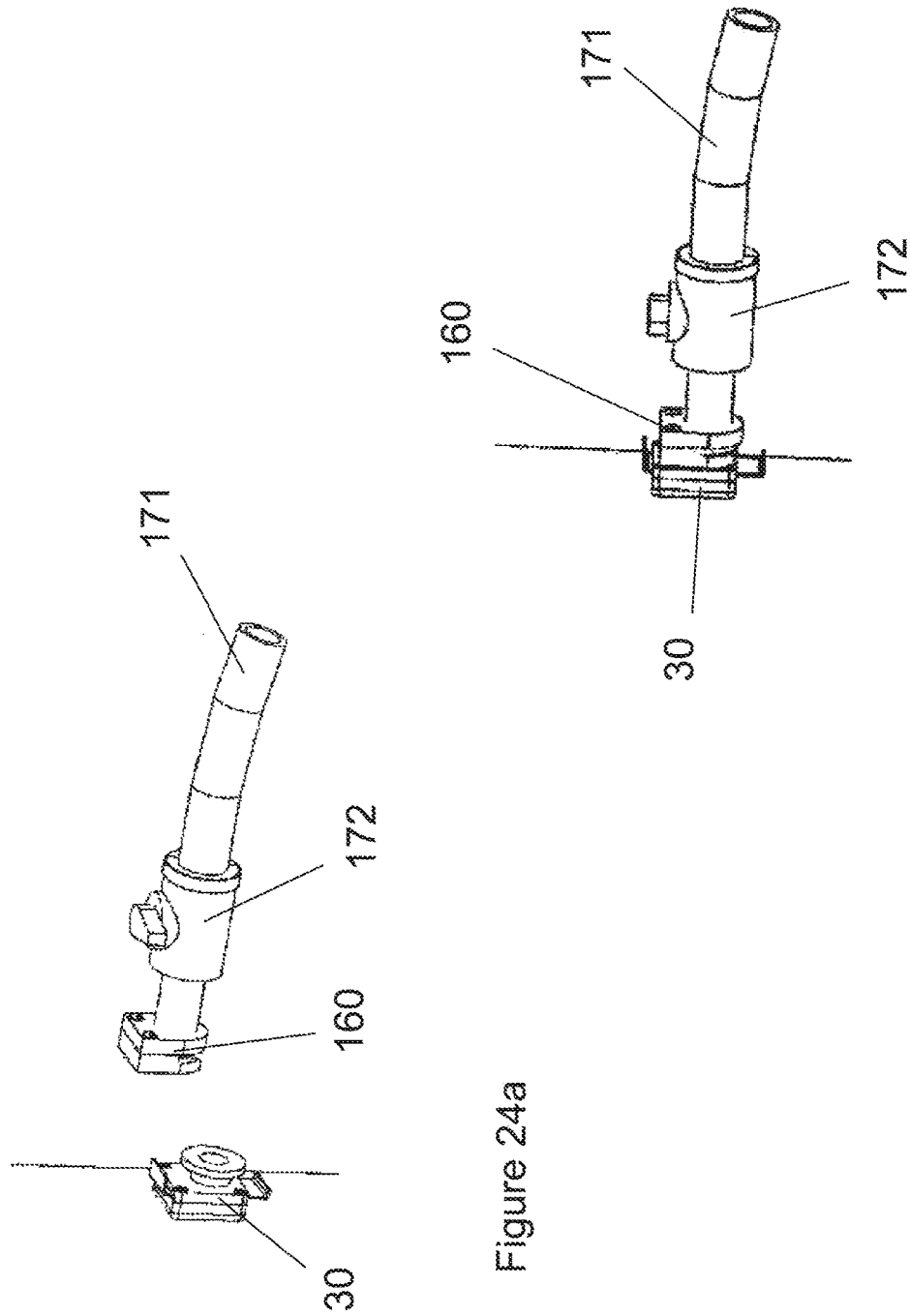

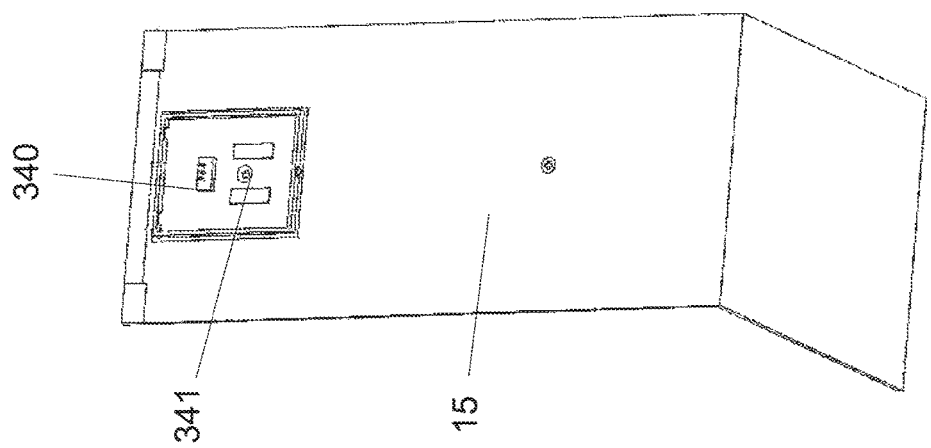

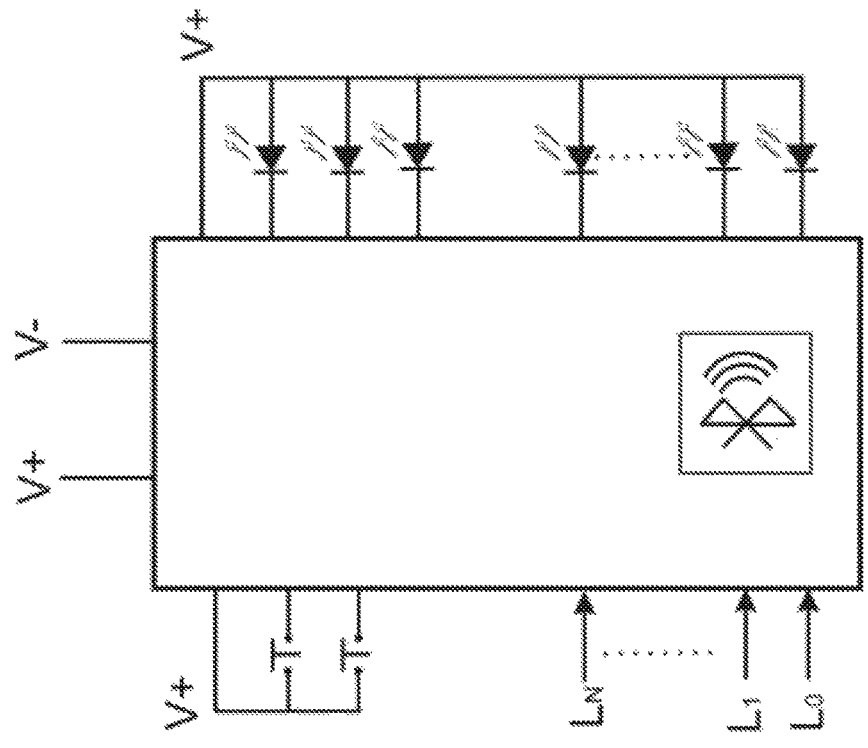
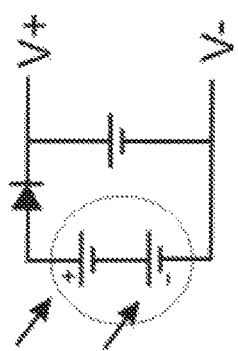
Figure 31b
Figure 31a

POTTED PLANT SYSTEM

FIELD OF THE INVENTION

The present invention relates to the field of plant watering systems and more specifically to a plant watering system have a quick-connect sliding valve.

BACKGROUND

Watering of potted plants has long been an inconvenient task for commercial and at home users. Plants with dense foliage or blossoms are generally watered from the top, using a spray nozzle or a watering bucket. As some potted plants are hung from at an elevated height, the effort required to fully water the plants is even more challenging. Most of the water sprayed onto the plants runs down the dense foliage and end up on the floor. In order to direct most of the water into the soil of each potted plant, the user must push aside the dense foliage, locate the pot and pour water directly into the top soil. Water has to be applied relatively slowly in order to allow for absorption. As users of potted plants, in general, have more than one potted plant, the user is required to replenish the water of multiple potted plants at various points in time. This can often be quite laborious and time consuming. Users often forget the correct times to water certain potted plants, causing the plant to become dehydrated and die or not present well. There is a need in the industry for a viable method of controlling the water within the potted plant and provide a means of maintaining water within the soil so as to decrease the number of times the plant is manually watered. Additionally, there is a need within the industry for potted plant system that maintains water saturation of the soil at an optimum levels thereby providing maximum growth and plant development.

Various attempts have been made to alleviate the inconvenience associated with watering of potted plants. Devices such as: U.S. Pat. No. 3,990,179 (Johnson); U.S. Pat. No. 4,102,081 (Morrow); and, U.S. Pat. No. 5,829,193 (Otake), provide such examples of potted plant systems.

Johnson discloses a pot for plants primarily used for a hanging pot. The purpose of the Johnson is to provide for an aesthetically pleasing hanging pot. Johnson attempts to provide an aesthetically pleasing pot by providing numerous openings throughout the pot which are subsequently penetrated by stems and branches of the plant. As such, stems or main branches of the plant protrude through the openings and effectively conceal the pot. The pot described in Johnson contains walls with drainage openings that allow water to flow into the drainage tray. Johnson does not provide a mechanism of storing excess water that is subsequently used to maintain water saturation within the soil of the hanging potted plant. Additionally, the pot described in Johnson does not provide a mechanism for draining the excess liquid from the hanging potted plant.

Morrow discloses an improved plant and flower container of the hanging type comprising a pot having a removable false bottom to provide a compartment for collecting and storing excess water for subsequent absorption by the plant. Additionally, the pot disclosed by Morrow provides a method of providing a hanging means that is centrally located through the middle of the pot. Morrow does not provide a mean of draining excess water, thereby allowing the squelching the pot and essentially the drowning of the plant. Additionally, Morrow does not provide a means of transporting excess water, which is pooling at the base of the pot up to the middle of the soil, thereby ensuring most of the roots of the plant have access to the water. Morrow's pot allows for reabsorption through simple apertures at the bottom of the pot. Depending on the water level in the excess water collection dish, the apertures may provide a means of water reabsorption into the bottom of the soil. Furthermore, Morrow's hanging pot does not provide a means for expelling excess water. The user of Morrow's pot is required to unhang the pot and drain the excess water manually.

Otake discloses a horticultural pot that is constructed of multiple highly absorbent layers which provide increased water retention. The multiple layers of the Otake pot are comprised of a super-absorbent-polymer-powder layer and a peat-moss-powder lawyer, which are interposed between an inner wall material constituted by a jute layer. The material provides a natural material, rich in air permeability, easily compatible with the roots of plants to enter. The pot disclosed in Otake does not provide a means of controlling excess water nor does it provide a means of draining excess water.

As such, there is a need for a potted plant system that can overcome the drawbacks as described above. Indeed, there is a need for a potted plant system that provides a means to control excess water in a manner that allows the water to be reabsorbed by the soil within the pot thereby increasing the time between watering. There is also a need for a potted plant system that provides a quick and efficient means for expelling excess water.

BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

FIG. 17 is a perspective cut-out view of the inner pot of the potted plant system tray, according to one embodiment of the present invention;

FIG. 18 is a perspective lower cut-out view of the potted plant system tray, according to one embodiment of the present invention;

FIG. 24a is a magnified perspective view of quick attach connector fitted with a hose connector valve and a hose spatially aligned for attachment onto the quick connect sliding valve, according to one embodiment of the present invention;

FIG. 24b is a magnified perspective view of quick attach connector fitted with a hose attached onto the quick connect sliding valve, according to one embodiment of the present invention;

FIG. 30a is a perspective cut-out view of the water monitor assembly, according to one embodiment of the present invention;

FIG. 31a is a schematic of the electrical circuit for a power source to the water monitor, according to one embodiment of the present invention;

FIG. 31b is a schematic of the electrical circuit for the water monitor in the potted plant system, according to one embodiment of the present invention;

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
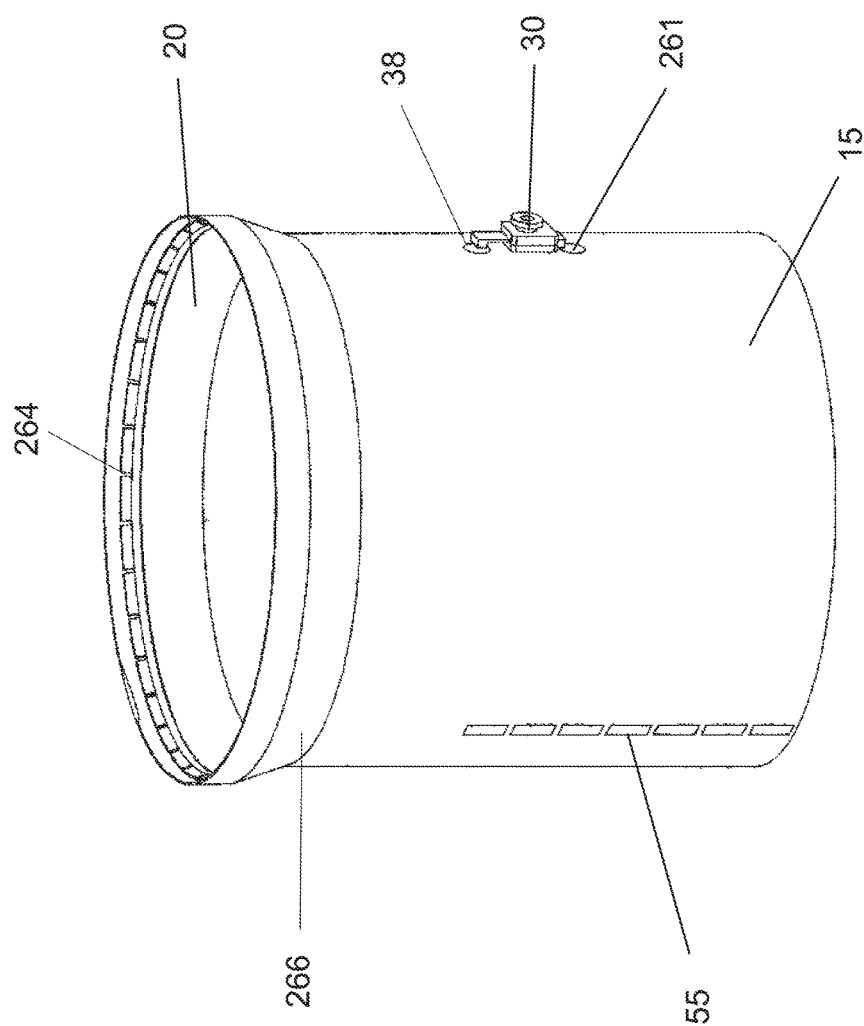
FIG. 1 is a perspective view of a potted plant system, according to another embodiment of the present invention.
Figure 2:
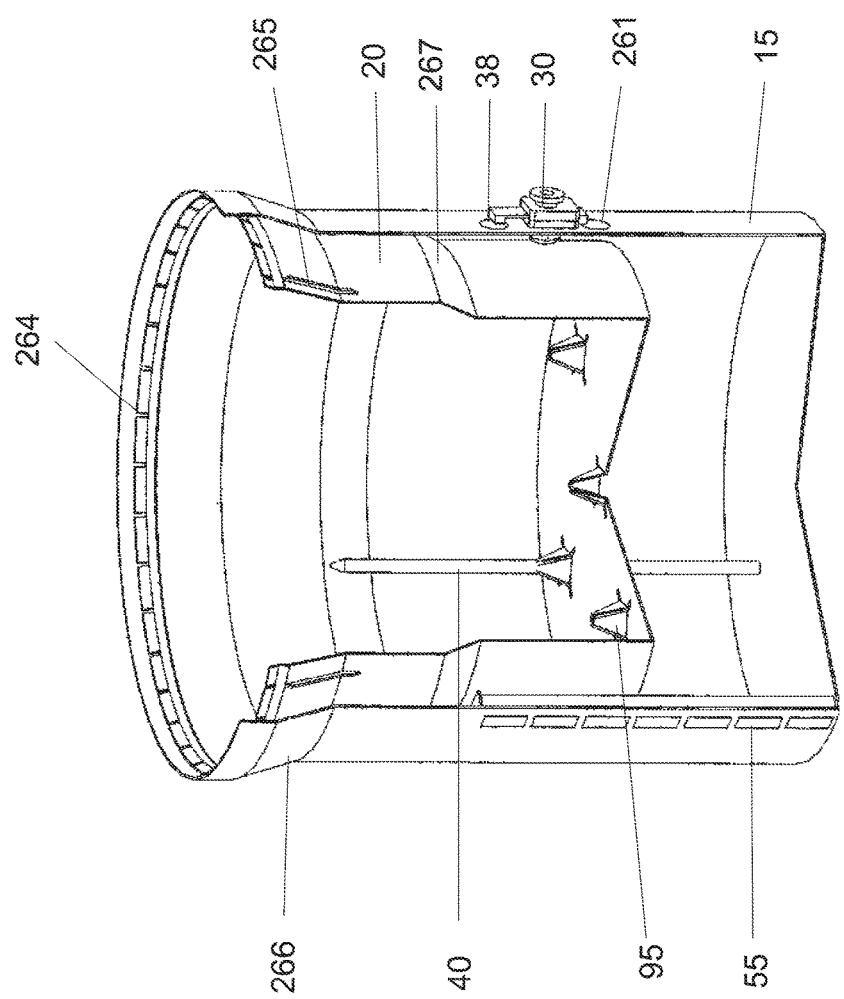
FIG. 2 is a perspective cut-out view of a potted plant system, according to another embodiment of the present invention.

With reference to FIGS. 1, and 2 and according to one embodiment of the present invention, a potted plant system 10 is shown. The potted plant system 10 is comprised of: an outer pot 15; an inner pot 20; pot hanging system 25; a quick connect sliding valve 30; spacer 35; and a water level adaptor 115. The potted plant system 10 provides the user an ability to alter the scheduling of water maintenance of potted plants by extending the time between watering. Extended periods between watering is one key aspect of the potted plant system 10. Through the creation of a reservoir, a space in between the inner and outer pot, 20 and 15 respectively, water can be stored within the potted plant system 10. The reservoir volume can be increased through the use of a spacer 35. The stored water (not shown) is reabsorbed by the soil housed the plotted plants. Reabsorption can occur through a fluid connectivity between the dispersed apertures 110 located throughout the body of the inner pot 20 and the reservoir. In addition, the fluid connectivity between the linearly dispersed apertures 110 and the reservoir provides a means for excess water to drain from the inner pot 20 to the reservoir during watering. Reabsorption can also occur through the use of wicks 40, which operates under capillary action to transport water from the reservoir to the center of the soil. As water saturation in the soil decreases, the water within the reservoir is passively transported to the soil, thereby rehydrating the potted plant (not shown). A worker skilled in the relevant art would appreciate the various means of passively transferring water from the reservoir to the soil based on the saturation level of the soil. The quick connect sliding valve 30 provides for a means of expelling excess water from the potted plant system 10. The user can expel the excess water by opening the quick connect sliding valve 30. A user can maintain a predetermined amount of excess water from being displaced from the potted plant system through the addition of the water level adapter 115. Thereby the user can ensure that a desired amount of water remains within the outer pot 15 after draining. Additionally, the watering of the potted plant system 10 can be achieved automatically through the use of electronic water sensors and a system of automated valves that are connected to a water source and open upon the requirement of additional water. Yet in another embodiment of the present invention, the watering of the plant can occur through top soil watering. The connection between the outer and inner pot, 15 and 20, respectively, allows for efficient absorption of water into the soil while also providing an efficient mechanism of filling the outer pot reservoir. Channels 264 on the outer edge of the inner pot 20 allows for efficient water passage into the reservoir of the outer pot (not shown). The solid gaps between the channels also prevent evaporation of water once in the reservoir of the outer pot (not shown). The outer shoulder 266 provides a setting mechanism between the outer and inner pot, 15 and 20, respectively. The potted plant system 10 can be used on pots that are positioned on a surface, such as the floor or a table, or on pots that are hung. The location of the quick connect sliding valve 30 differs depending on the intended positioning of the potted plant system 10. If the potted plant system 10 is placed on a surface, the quick connect sliding valve 30 is positioned on the side of the outer pot 15. In addition, and in another embodiment of the present invention, the quick connect sliding valve can also be positioned along the outer pot 15 within various valve ports 38, thereby varying the reservoir water level within the outer pot 15. Based on the positioning of the quick connect sliding valve 30, excess water can be removed without the requirement of a special stand or the lifting the potted plant system 10. Such quick connect sliding valve positioning can be seen in FIGS. 1 and 2. On the other hand, if the potted plant system 10 is hung, the quick connect sliding valve 30 is placed at the bottom of the outer pot 15 (not shown). Water pooled in the reservoir will be drained only to the height of the quick connect sliding valve 30 as seen in FIG. 2. Alternatively, the water pooled in the reservoir of the outer pot 15 to the height of the quick connect sliding valve 30. The height can be varied by repositioning the quick connect sliding valve 30 on the various port valve ports 38. When not in use with quick sliding valve 30, the valve ports 38 are fitted with port plugs 261, which prevents water from escaping from the water reservoir (not shown). The water reservoir helps extend the length of time between watering the plants without over saturating the soil within the potted plant system 10. The water level adapter 115, based on the positioning of the quick connect sliding valve 30, can have varying heights. A worker skilled in the relevant art would appreciate the various heights the water level adaptor 115 or positioning of the quick connect sliding valve 30 along the outer pot 15, can take in order to maintain water in the inner pot 20 while extending past the water reservoir (not shown). To ensure optimal amount of water is within the reservoir, the outer pot 15 contains a water level indicator 55. The water level indicator 55, can be a clear portal so the user can see within the outer pot 15. The clear portal can be multiple small apertures that indicate water level, as seen in FIGS. 1 and 2. The clear portals of the water level indicator can also consist of clear valve ports 38. With specific reference to FIG. 2, the valve ports 38, which are used to vary the water level within the reservoir of the outer pot act as clear portal water level indicator 55 when not in use. Alternatively, a water level indicator 55 can also be comprised of an electrical system, wherein the level of water is assessed and digitally displayed on an electronic water monitor (not shown). The spacer 35 raises the inner pot 20 within the outer pot 15, thereby providing for a larger reservoir for water to collect. A worker skilled in the relevant art would also appreciate that the potted plant system 10 can be comprised of all the elements or can be comprised with one or two elements missing. Elements of the potted plant system 10 can be removed based on user requirements and plant needs. Depending on the plant, the amount of user interaction, and placement of the potted plant system 10, such variables modifies the need for all elements described herein. For example, the inner pot 20 can be the pot in which the potted plant is purchased, thus reducing the need for a user to replant the potted plant in a potted plant system specific inner pot 20.

With specific reference to FIG. 2, and according to one embodiment of the present invention, the cut-out of the potted plant system is shown. In this embodiment, the inner pot 20 is set within the outer pot 15. The outer lip of the inner pot 20 sets within the outer lip of the outer pot 15. The outer shoulder 266 of the outer pot 15 further supports the inner pot 15. The outer lip of the inner pot 20 contains numerous channels 264. The channels 264 provide water passage channels when the potted plant system 10 is watered from the top. As is often the case, water poured onto the soil (not shown) in the inner pot 20 is not absorbed at the same rate as the pour rate. Water accumulates on the surface of the soil (not shown) and if not monitored, can spill from the side. The channels 264 provide for the accumulated surface water to efficiently drain into the reservoir of the outer pot (not shown). The fins 265 provides an water passage gap between the outer and inner pot, 15 and 20, respectively, to provide efficient draining of water into the reservoir (not shown). The support of the inner pot 20 by outer shoulder 266 of the outer pot 15 allows the formation of the reservoir within the outer pot 15 as the inner pot 20 is suspended. The reservoir can be varied based on the type of inner pot 20 that is used within the potted plant system 10. The inner pot 20 can vary in depth. The shorter the depth of the inner pot 20, the more space that is between the inner and outer pot, 20 and 15 respectively, and the larger the reservoir formed in the outer pot 15. Conversely, the longer the depth of the inner pot 20, the less space that is between the inner and outer pot, 20 and 15 respectively, and the smaller the reservoir formed in the outer pot 15. The inner pot shelf 267 provides additional space between the inner and outer pot, 20 and 15 respectively, which in turn provides a larger reservoir cavity in the outer pot 20. The water level indicator 55 provides a means for visually identifying the water level within the reservoir of the outer pot 15. In another embodiment of the present invention, the valve ports 38 can be used as a water level indicator. Through construction of the port plugs 261 with a clear material, the valve ports 38 not in use with the quick connect sliding valve 30 can be used to view the water level within the reservoir of the outer pot 15. At the base of the inner pot 20 contains numerous pyramid type structures 98 that helps hold wicks 40 in place and prevents the wicks 40 from sliding into the outer pot 15 through the force of gravity, soil, or plat root formation (not shown). A worker skilled in the relevant art would appreciate the various means that a pyramid type structure 98 can be constructed to hold a wick 30 in place.

Figure 3:
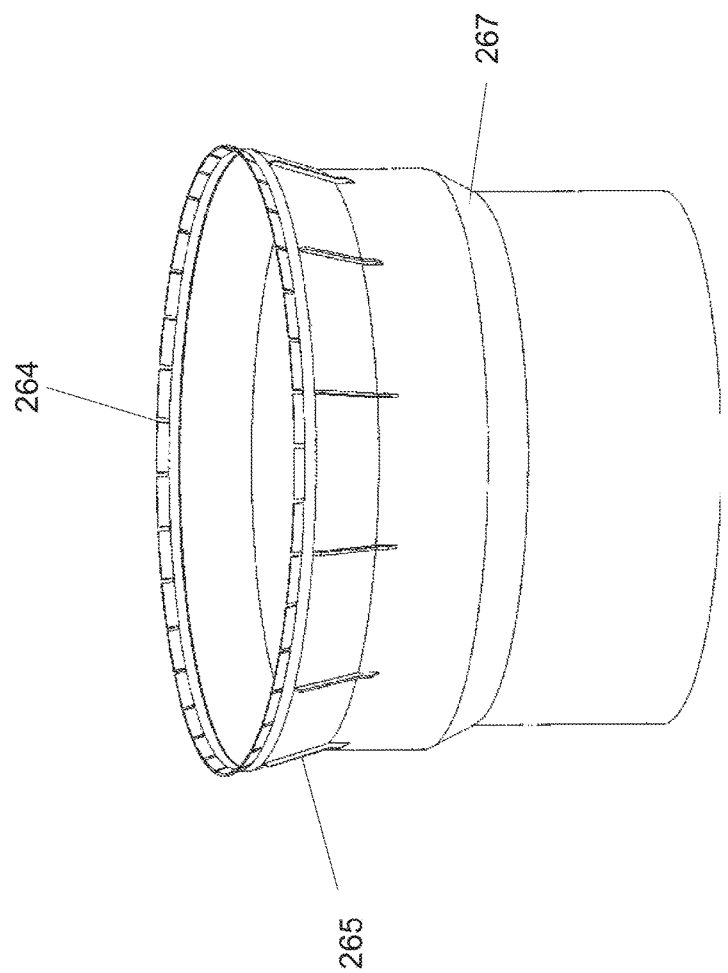
FIG. 3 is a perspective view of the inner pot of the potted plant system, according to another embodiment of the present invention.

With reference to FIG. 3 and according to another embodiment of the present invention, the inner pot 20 is shown. The Channels 264 are shown on the rim of the inner pot 20. The channel 264 gap is large enough to permit efficient water passage (not shown) while also being small enough to limit the subsequent evaporation of water from the reservoir (not shown). The channels are between 4 mm to 15 mm long. Likewise, the gap between the channels 264 further prevents excess water evaporation from the reservoir (not shown). The fins 265 provides separation between the inner wall of the outer pot 15 and the outer wall of the inner pot 20. The separation allows for the water that enters the channel 264 to freely flow down into the reservoir of the outer pot (not shown). The inner pot shelf 267 provides an even larger gap between the inner wall of the outer pot 15 and the outer wall of the inner pot 20. The gap provides further reservoir space.

Figure 4A:
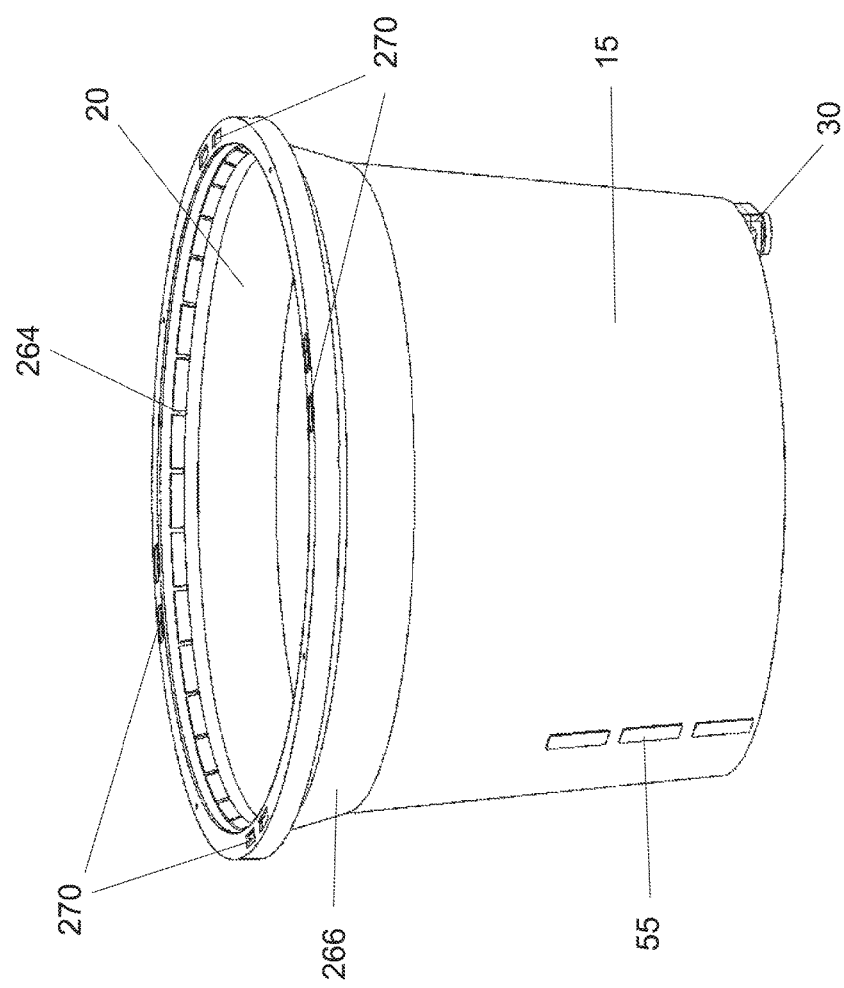
FIG. 4a is a perspective view of a hung potted plant system, according to another embodiment of the present invention.
Figure 4C:
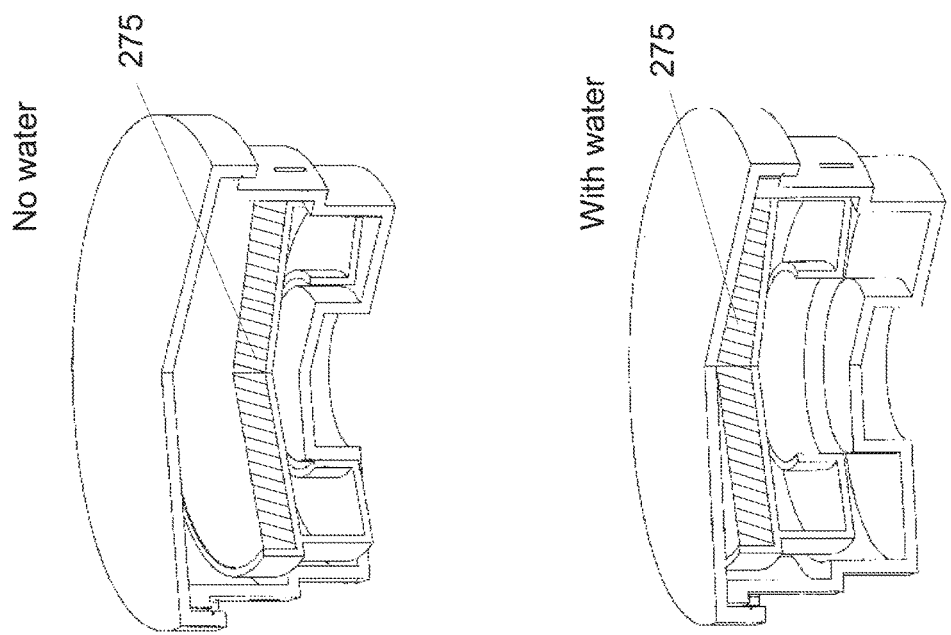
FIG. 4c is a perspective cut-out view of a water indicator puck in presence or absence of water, according to another embodiment of the present invention.
Figure 4B:
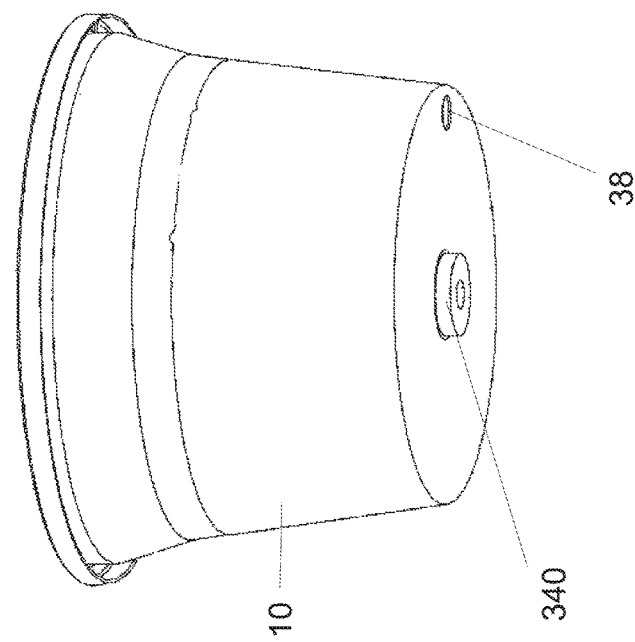
FIG. 4b is a lower perspective view of a hung potted plant system with a water indicator puck, according to another embodiment of the present invention.

With reference to FIG. 4 and according to one embodiment of the present invention, the hanging potted plant system 10 is shown containing the outer shoulder 266. In this embodiment, the handing potted plant system 10 is hung through the hanging apertures 270. The hanging system (not shown) is looped through the hanging apertures 270 at three locations along the upper rim of the outer pot 15. A worker skilled in the relevant art would appreciate the various connection means between the outer pot 10 and the hanging system (not shown). Additionally, a worker skilled in the relevant art would appreciate the mechanism of hanging, and thus would understand that the number of hanging apertures 270 can vary but the amount required needs to ensure stability of the potted plant system 10. The inner pot 20 is fitted into the outer pot 15 and rests on the outer shoulder 266. With specific reference to FIG. 4a, the water level indicator 55 are located on the outer pot 15 and are positioned closer to the bottom as the reservoir (not shown) is located at the bottom. The water level indicators are also positioned on the bottom of the outer pot 15 as to provide easier viewing to the user. The hanging potted plant system 10 is hung and is located at a level that is often higher than the average height of a user. As a result of hanging the potted plant system 10, the quick connect sliding valve 30 is positioned on the bottom of the outer pot 15, as its location allows the user easier access when hung. The quick connect sliding valve 30 is shown positioned on the corner of the outer pot 15. The corner positioning is advantageous as it allows the use of a standard, and straight water level adaptor (not shown) to set the maximum water level within the reservoir of the outer pot 15. With specific reference to FIG. 4b, the water level indicator is positioned at the bottom of the outer pot 15 of the potted plant display system 10. The water indicator puck 340 contains a clear base wherein a user can see through and a water permeable top that is attached within the inner portion of the outer pot 15. With specific reference to FIG. 4c, the cut-out a water indicator puck is shown. A floater 275 is positioned within the water indicator puck 340 and is able to move vertically in the presence of water within the reservoir. When the reservoir lacks water, the floater 275 is against the clear base of the water indicator puck 340 and can be seen by a user. The visibility of the floater 275 within the water indicator puck 340 alerts the user that the reservoir lacks water and that watering is required. Alternatively, in the presence of water within the reservoir, the floater 275 rises and is no longer in contact with the base of the water indicator puck 340. The distance between the floater 275 and the base of the water indicator puck 340 makes it harder and harder for a user to observe the floater 275, thus indicating to the user that the potted plant system does not require watering. A worker skilled in the relevant art would appreciate the various means to further differentiate the visual cues of the floater 275 to make its location within the water indicator puck 340 more obvious.

Figure 5:
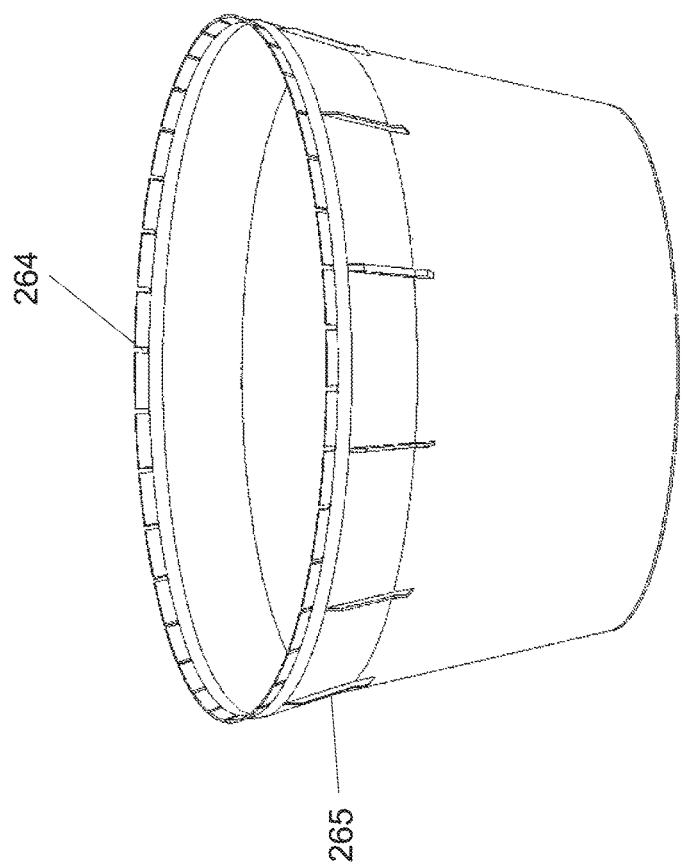
FIG. 5 is a perspective view of the inner pot of the hung potted plant system, according to another embodiment of the present invention.

With reference to FIG. 5 and according to one embodiment of the present invention, the inner pot 20 containing the channels 264 of the hanging potted plant system is shown. The inner pot 20 of the hanging potted plant system (not shown) lack the inner pot shelf (not shown) as the reservoir will not be as spacious as a precautionary measure. The hanging potted plant system is hung, and a user will want to limit the weight, which corresponds to the amount of water in the reservoir for safety. The inner pot 20 contains the fins 265 to allow for water passage between in the inner pot 20 and the outer pot (not shown) through the channels 264 when the plants are water through a top down method by the user.

Figure 6:
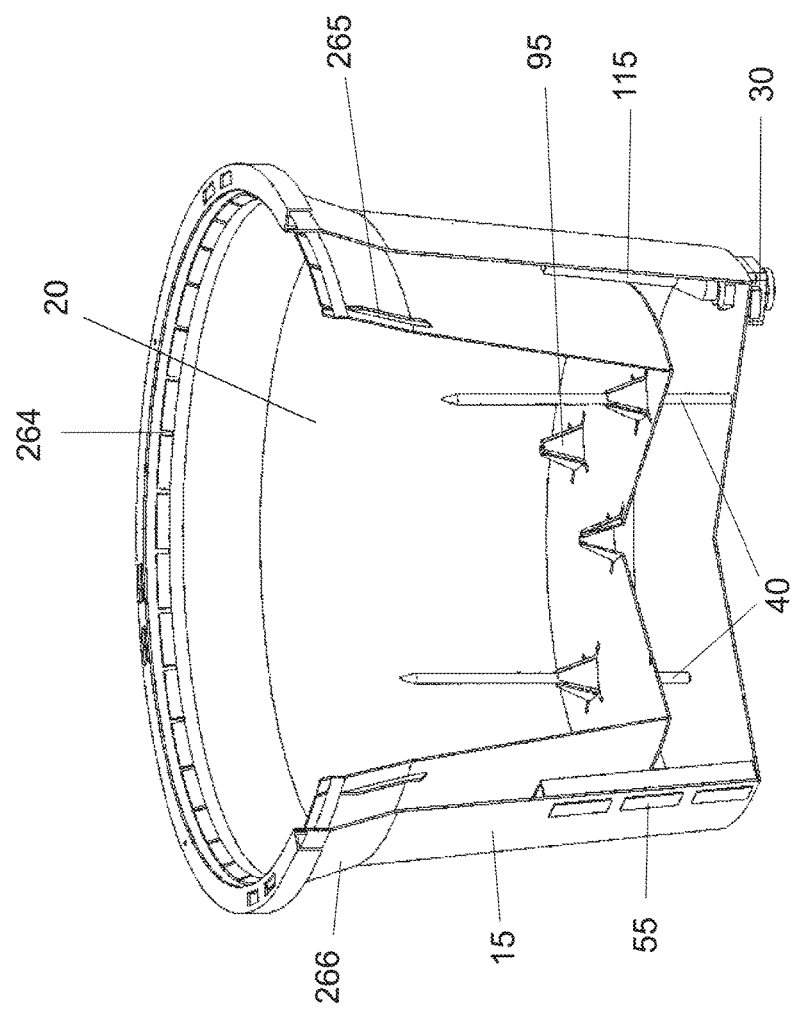
FIG. 6 is a perspective cut-out view of a hung potted plant system, according to another embodiment of the present invention.

With reference to FIG. 6 and according to one embodiment of the present invention, the hanging potted plant system 10 is shown containing the outer shoulder 266. The inner pot 20 is set within the outer pot 15 and rests on the outer shoulder 266 of the outer pot 15 resulting in the formation of the reservoir within the out pot 15. The wicks 40 traverse the reservoir of the outer pot 15 and the interior of the inner pot 20. The wicks 40 are held in place through the projecting columns 98 at the base of the inner pot 20. The projecting columns 98 are pyramidal shaped and allow the wick 40 to run through it only in the upwards trajectory. The corner placement of the quick connect sliding valve 30, allows for the water level adaptor 115 to be straight and run vertically. The fins 265 provide a gap between the inner pot 20 and the outer pot 15 and allow for water to efficient run down from the channels into the reservoir of the outer pot. The water level indicator 55 is shown on the side of the outer pot 15.

Figure 7A:
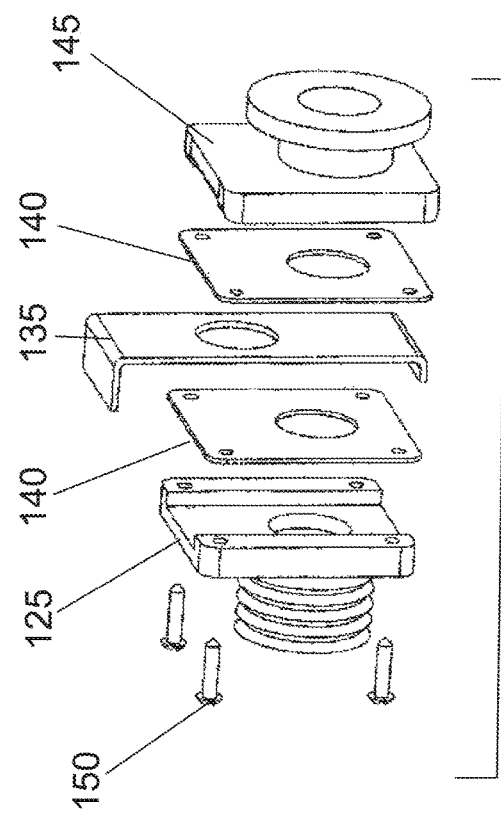
FIG. 7a is a perspective exploded view of a quick connect sliding valve, according to one embodiment of the present invention.
Figure 7B:
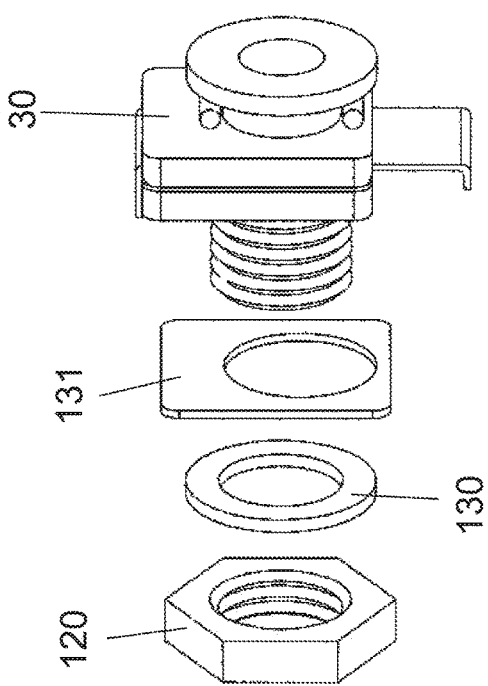
FIG. 7b is a perspective view of a quick connect sliding valve with nut and washer outer pot attachment, according to one embodiment of the present invention.
Figure 8:
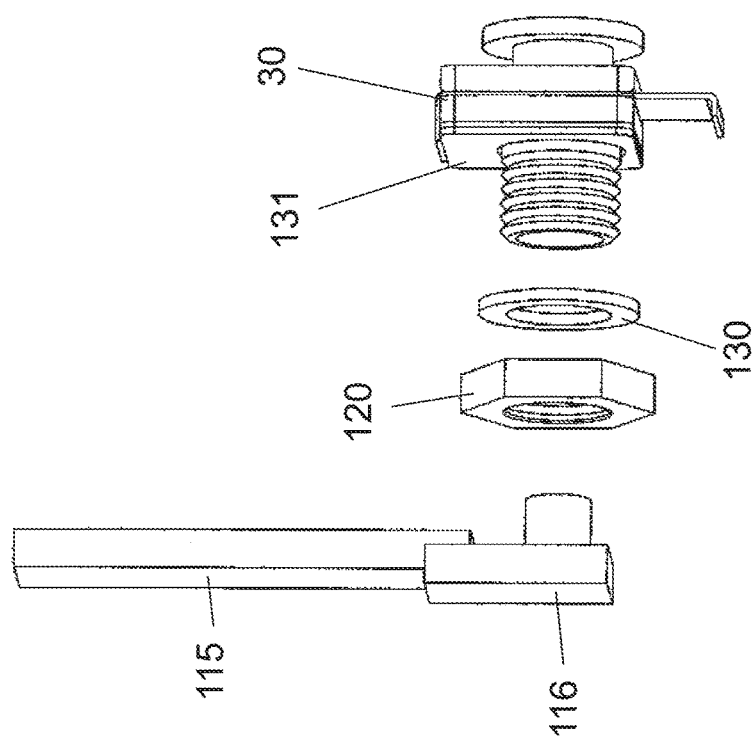
FIG. 8 is a perspective exploded view of a quick connect sliding valve with a water level adaptor, according to one embodiment of the present invention.

With reference to FIGS. 7 and 8, and according to one embodiment of the present invention, the quick connect sliding valve 30 and the associated components are shown in greater detail. A worker skilled in the relevant art would appreciate the various valves that can be employed within the Potted Plant System (not shown) that would allow the user to quickly open and close the valve and provide a quick connection means. In the configuration shown in FIGS. 7 and 8 and according to one embodiment of the present invention, the quick connect sliding valve 30 is attached to the side of the outer pot (not shown). With specific reference to FIGS. 7a and 7b, the quick connect sliding valve is shown in an exploded view with 7b also including the attachment means to the outer pot (not shown). The quick connect sliding valve 30 is primarily comprised of: lug 125; slider bar 135; seal 140; outer neck enclosure 145; and, attachment screws 150. To attach the quick connect sliding valve 30 onto the outer pot (not shown), a nut 120 and first and second washers, 130 and 131 respectively, are employed. The nut 120 fastens the sliding valve 30 onto the outer pot (not shown), while the first washer 130 is adapted to the surface of the pot and the second washer 131 seals aperture to ensure a waterproof seal. A worker skilled in the relevant are would appreciate that the first and second washers, 130 and 131 respectively, can be comprised of rubber or silicone. With specific reference to FIG. 8 the quick connect sliding valve 130 is shown connecting, in an exploding view, to the draining pipe, the water level adaptor 115. The quick connect sliding valve 30 can be used within the potted plant system as a standalone device, or it can be accompanied by a water level adapter 115, as shown in FIG. 8. The nut 120 and the first and second washers, 130 and 131 respectively, attach the quick connect sliding valve 30 to the outer pot (not shown). The valve adaptor 116 sets within the quick connect sliding valve 30 and functions to connect the water level adapter 115 to the quick connect sliding valve 30. The water level adaptor 115 functions to increase the water level in the reservoir in the outer pot (not shown) from the location of the quick connect sliding valve 30 to the top of the water level adaptor 115. In yet another embodiment of the present invention, the water level adapter 115 is not required to increase the water level within the reservoir within the outer pot (not shown). The quick connect sliding valve is attached to the water level aperture (not shown) at the desired water level of the reservoir within the outer pot (not shown).

Figure 9:
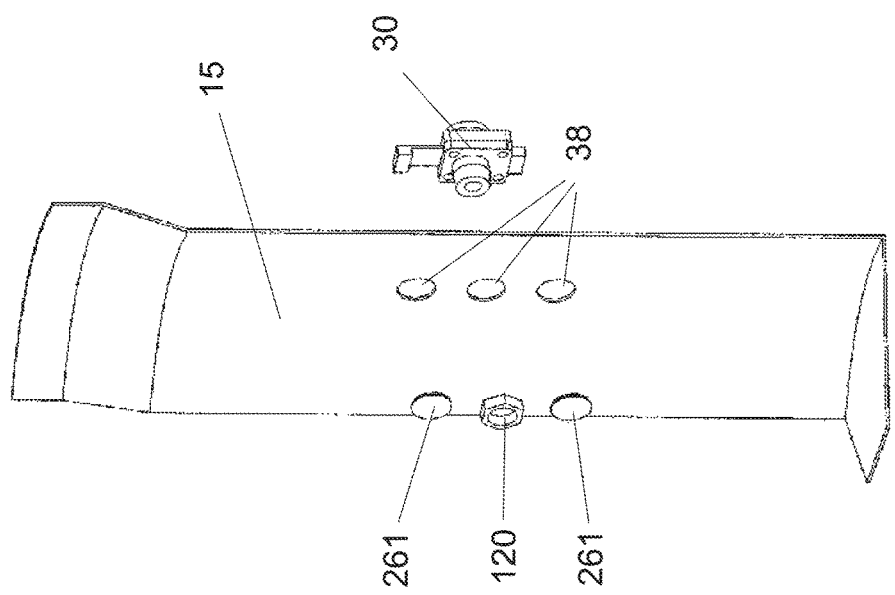
FIG. 9 is a perspective exploded cut-out view of the of the quick connect sliding valve positioning on the outer pot through valve ports, according to one embodiment of the present invention.

With specific reference to FIG. 9, and according to one embodiment of the present invention, the mounting of the quick connect sliding valve 30 to the valve ports 38 of the outer pot 15 is shown. The outer pot 15 is shown to have three valve ports 38. A worker skilled in the relevant art would appreciate the number of valve ports 38 can vary and depend on their use. If they are used as water level indicators, through the use of clear port plugs 261, then a worker skilled in the relevant art would appreciate that the number of valve ports 38 would increase to allow the user for a better assessment of the water level within the reservoir (not shown). The maximum reservoir level is chosen by the user to be any one of the valve ports 38 and the quick connect sliding valve 30 is set within the selected valve port 38 and fastened with the use of the nut 210. The remainder of the unused valve ports 38 are fitted with port plugs 261.

Figure 11:
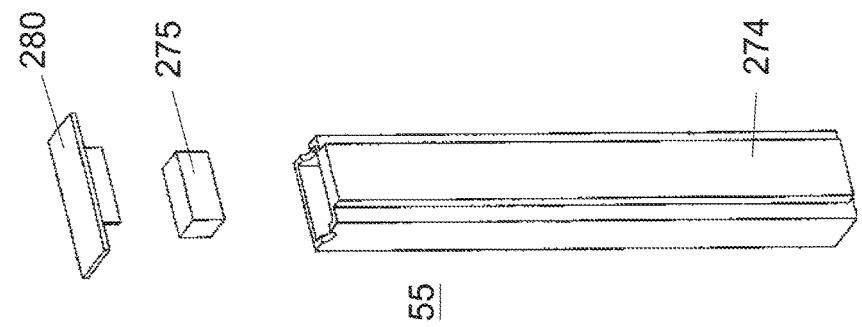
FIG. 11 is a perspective rear view of the water level indicator, according to one embodiment of the present invention.
Figure 10:
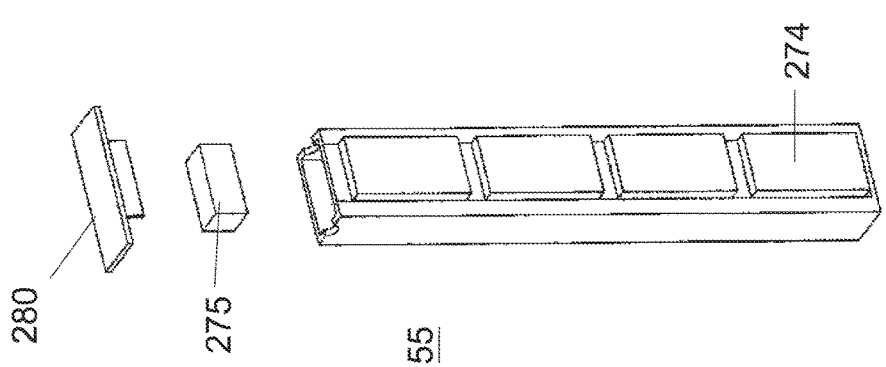
FIG. 10 is a perspective front view of the water level indicator, according to one embodiment of the present invention.

With specific reference to FIGS. 10 and 11, and according to one embodiment of the present invention, the water level indicator 55 is shown. The water level indicator is primarily comprised of: water permeable housing 274; a floater 275; and, the cap 280. The water permeable housing 275 allows water to enter only on the side that is facing the reservoir in the inner pot, as seen in FIG. 11. The outward facing side of the water permeable housing 274 is water tight and prevents water from escaping the outer pot 15. The floater 275 is placed inside the water permeable housing 274 and is allowed to move freely in the vertical direction. The cap 280 prevents the floater 275 from escaping from within the water permeable housing 274. As water rises in the reservoir (not shown) the floater 275 floats on the surface and rises within the water permeable housing 274. The outward facing side of the water permeable housing 274 is made of a clear material. This allows a user to view the floater within the water permeable housing of the water level indicator 55 and quickly determine the water level within the reservoir of the outer pot (not shown).

Figure 12B:
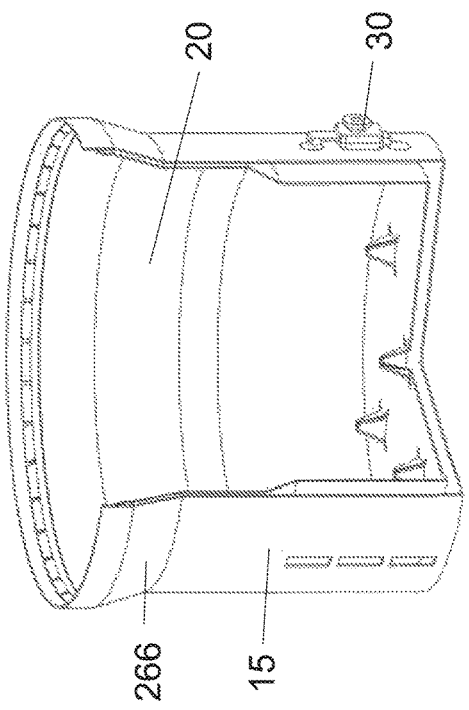
FIG. 12b is a perspective cut out view of a potted plant system having a quick connect sliding valve with a water level adaptor positioned on a wall/side of the outer pot, according to one embodiment of the present invention.
Figure 12A:
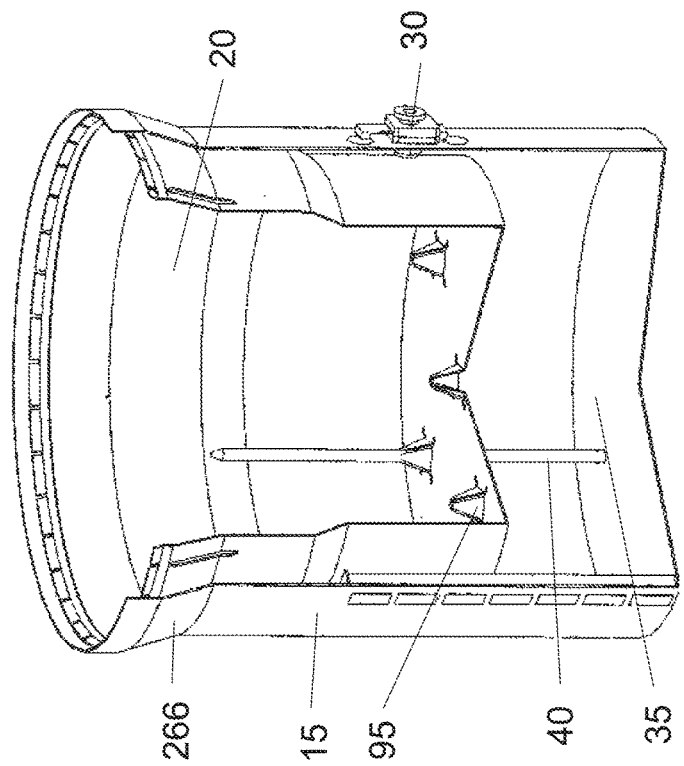
FIG. 12a is a perspective cut out view of a potted plant system having a quick connect sliding valve positioned on the side of the outer pot, according to one embodiment of the present invention.

With specific reference to FIGS. 12a and 12b, and according to one embodiment of the present invention, a cut out of the potted plant system 10 is shown. The potted plant system 10 is shown containing: outer pot 15; inner pot 20; spacer 35; quick connect sliding valve 30 located on the side of the outer pot 15; and a wick 40. The spacer 35 increased the water reservoir between the outer pot 15 and the inner pot 20. The wicks 40 transfer water from the reservoir to the soil within the inner pot 20. With specific reference to FIG. 12a, the potted plant system 10 is shown without the water level adaptor 115. In this configuration, the water reservoir will be maintained up to the level of the quick connect sliding valve 30 location. In this case the water reservoir will be maintained up to the to base of the inner pot 20. As such the only means of absorbing water from the reservoir to the soil in the inner pot 20 is through the wicks 40. The inner pot 20 contains multiple projecting columns 95. The projecting columns 95 provide for a means for objects, such as wicks 40 to penetrate into the inner region of the inner pot 20. The level of the water reservoir is maintained at the level of the quick connect sliding valve 30 as water will stop draining from an open quick connect sliding valve 30 at that point. With specific reference to FIG. 12b a water level adaptor 115 is connected to the quick connect sliding valve 30. In this configuration, the reservoir is maintained to the top of the water level adaptor 115. As such, water will surpass the inner pot 20 base. As such, the bottom soil will be submerged. It is not optimal to have most of the soil submerged in water as plants suffer from a lack of oxygen, leading to death of roots and a loss in plant vigor. Water is reabsorbed by the soil through the wick 40 and inner pot 20 dispersed apertures 110.

Figure 13:
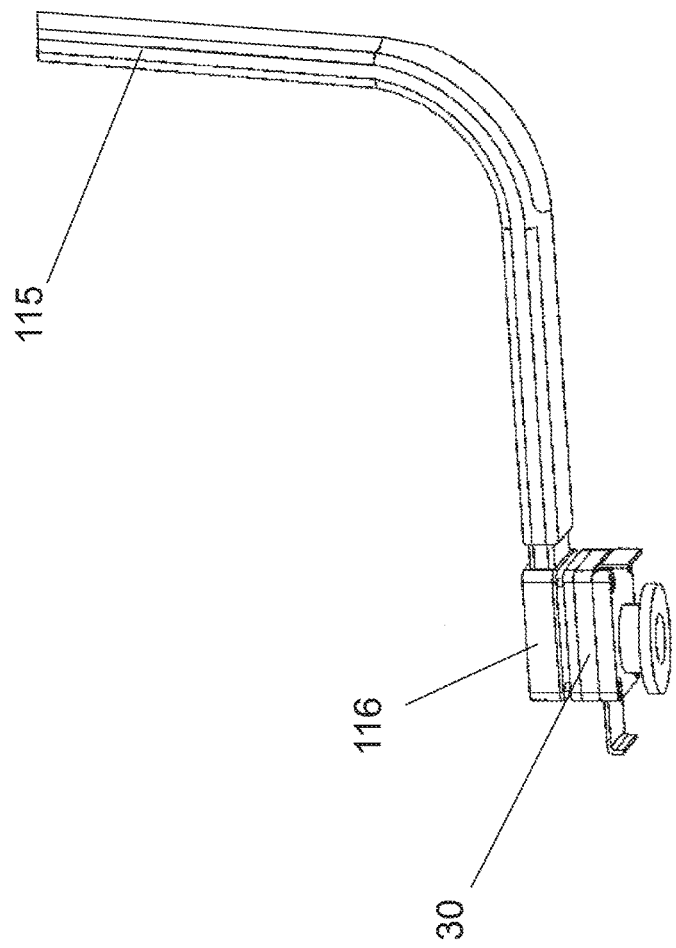
FIG. 13 is a perspective view of a quick connect sliding valve which is designed to be positioned on the bottom of the outer pot, fitted with a water level adaptor, according to one embodiment of the present invention.

With specific reference to FIG. 13 and according to one embodiment of the present invention, the quick connect sliding valve 30 is shown in bottom attachment configuration connected to the water level adaptor 115. The positioning of the quick connect quick connect sliding valve 30 influences the shape of the water level adaptor 115. With specific reference to FIG. 8, the quick connect quick connect sliding valve 30 is positioned on the bottom of the outer pot (not shown). In this configuration, the quick connect sliding valve 30 is fitted with a valve adaptor 116, which facilitates the connection of the water level adaptor 115 that extends upwards. The valve adaptor 116 can vary to accommodate the positioning of the quick connect sliding valve 30 and water level adaptor 115 connection. A worker skilled in the relevant art would appreciate the various means of attaching the water level adaptor 115 to the inner portion of the quick connect sliding valve 30. In this configuration, the valve adaptor 116 is positioned to attach to the water level adaptor 115 at the side of the quick connect sliding valve 30. To accommodate the positioning of the inner pot (not shown) within the potted plant system (not shown), the water level adaptor 115 is curved as to allow fitment of the inner pot (not shown) but also extend along the side of the outer pot wall (no shown). The quick connect sliding valve 30 operates in a manner where the user can manually open and close the valve by sliding the slider from the open to the closed position. A worker skilled in the relevant art would appreciate the various valve designs which would allow a user to manually operate the valve. A worker skilled in the relevant art would also appreciate the various automatic valves that can operate under pressure, to release excess water or operate electronically.

Figure 14:
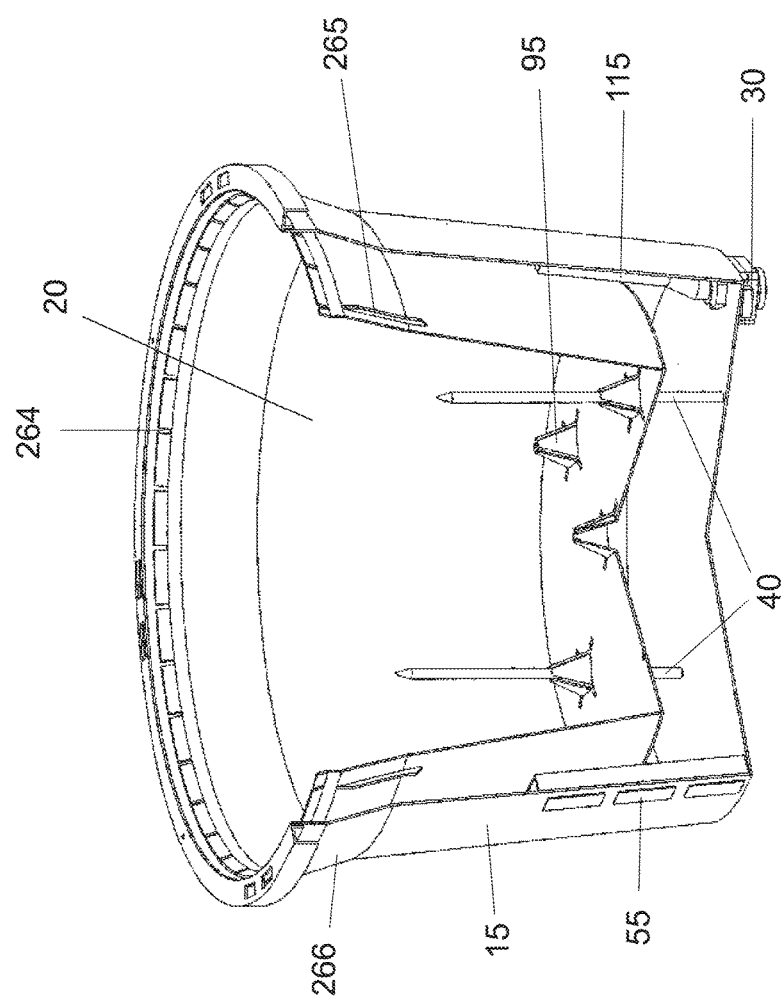
FIG. 14 is a perspective cut-out view of a hung potted plant system employing a valve adaptor and a water level adaptor, according to one embodiment of the present invention.
Figure 15:
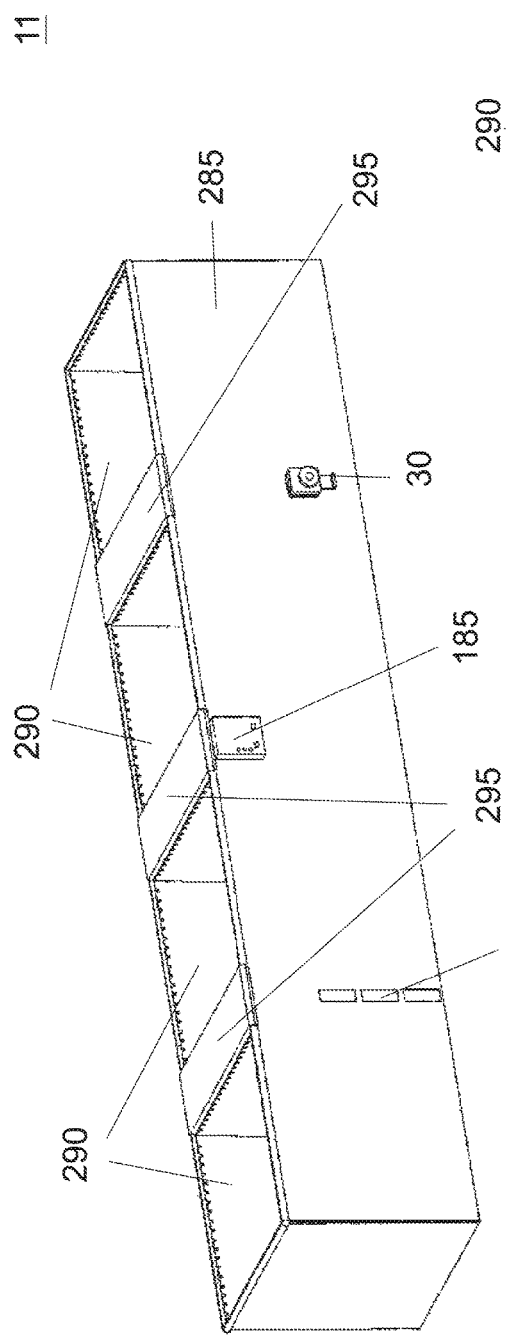
FIG. 15 is a perspective view of the potted plant system tray, according to one embodiment of the present invention.
Figure 16:
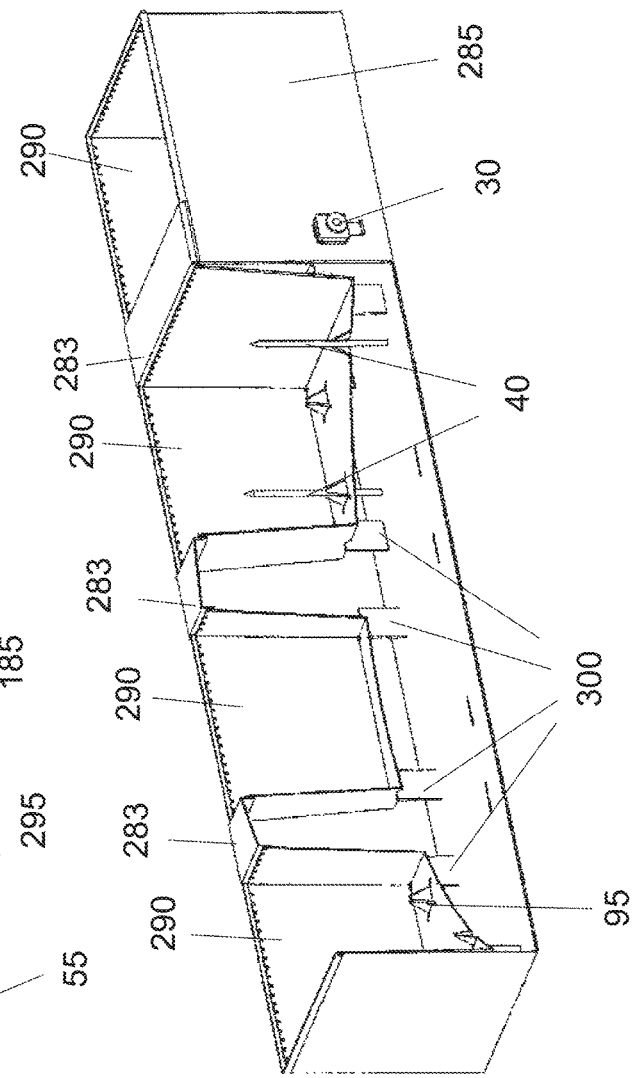
FIG. 16 is a perspective view of a partial cut-out of the potted plant system tray, according to one embodiment of the present invention.

With reference to FIG. 14, and according to one embodiment of the present invention, a cut out of the potted plant system 10 is shown in the hung orientation. As a result of hanging the potted plant system, the quick connect sliding valve 30 is positioned on the bottom of the outer pot 15. The inner pot 20 prohibits the water level adaptor 115 from extending directly upwards. As such, the valve adaptor 116 allows for the water level adaptor 115 to attach sideways into the quick connect sliding valve 30 thereby allowing the water level adaptor 115 to extend horizontally across the outer pot 15 until reaching the edge wherein the water level adaptor 115 extends upwards, between the inner and outer pot, 15 and 20, respectively. The water level adaptor 115 allows for the use of all inner pots 20, including the pots the potted plants were received at the plant nurseries. With specific reference to FIG. 14 a potted plant system 10 is shown.

With reference to FIGS. 15, 16, 17, and 18 and according to one embodiment of the present invention, the potted plant system tray 11 is shown. The potted plant system tray 11 is primarily comprised of: a plant chest 285; cubed inner pot 290; chest lid 295; and cubed inner pot pedestal feet 300. The plant chest 285 houses multiple cubed inner pots 290. With specific reference to FIG. 16, four cubed inner pot 290 are housed within the plant chest 285. A worker skilled in the relevant would appreciate that the plant chest 285 can house multiple cubed inner pot(s) 290. Based on the users need, a plant chest 285 can be constructed to house various multiples of cubed inner pot(s) 290. When housed in the plant chest 285, a gap is formed between adjacent cubed inner pot(s) 290. The gap is covered with a chest lid 295. The gap between the adjacent cubed inner pot(s) 290 provide for a reservoir in the plant chest 285 (not shown) and also provides the user quick access to the cubed inner pot 290 for easy removal. The plant chest 285 contains a water level indicator 55 to provide a visual cue to the user as to the water level within the reservoir (not shown). The reservoir within the plant chest 285 provides a water source for all cubed inner pots 290, thereby increasing the efficiency of the system. Water is expelled through the quick connect sliding valve 30. A water monitor 185 provides a digital assessment of the water level within the reservoir (not shown). With specific reference to FIG. 16, a partial cut-out of the potted plant system tray 11 is shown. The cubed inner pot 290 are set on pedestal feet 300. The pedestal feet elevate the cubed inner pot 290 and created a reservoir within the plant chest 285. Wick(s) 40 are set through the base of the cubed inner pot 290 to provide transfer of water from the reservoir to the soil (not shown) and, subsequently the plant (not shown), contained within the cubed inner pot(s) 290. With specific reference to FIG. 17, a cut-out view of the cubed inner pot 290 is shown. The cubed inner pot 290 contains channel(s) 264 to allow efficient transfer of water into the reservoir (not shown). Projecting column(s) 95 provide a means to hold wick(s) 40. With specific reference to FIG. 18, a lower cut-out view of the potted plant system tray 11 is shown. The cubed inner pot 290 housed in the plant chest 285.

Figure 19:
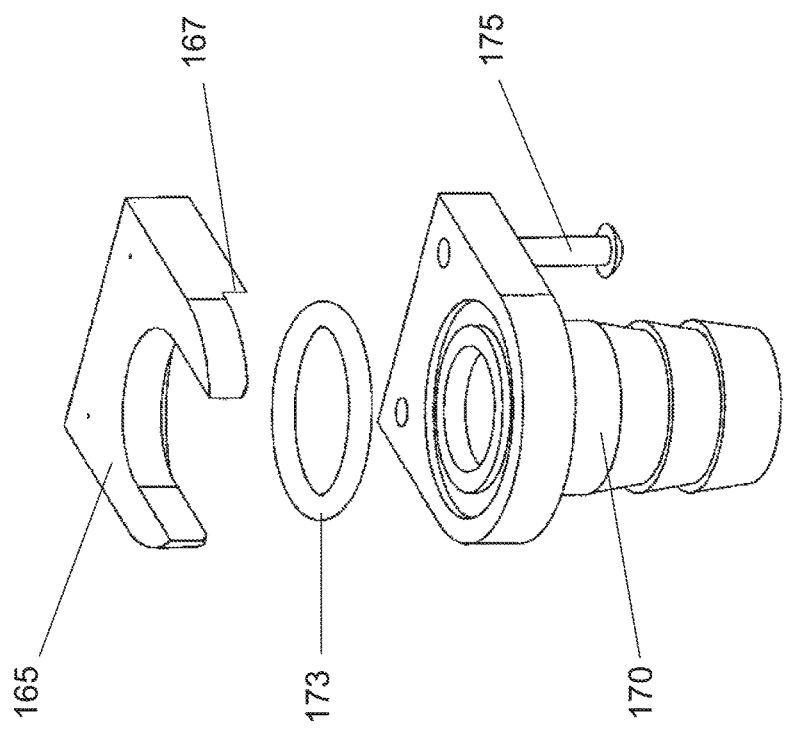
FIG. 19 is an exploded view of a quick attach connector used in the potted plant system, according to one embodiment of the present invention.

With reference to FIG. 19 and according to one embodiment of the present invention a quick attach draining connector 160 is shown. The quick attach draining connector 160 is shown in an exploded view. The quick attach draining connector 160 is primarily comprised of: U-shaped hook clasp 165; a draining chute 170; O-ring 173; and, U-shaped hook screws 175. The U-shaped hook clasp 165 contains a spacer beam 167. The spacer beam 167 provides a gap within the U-shaped hook clasp 165 where the quick attach draining connector 160 attaches to the quick connect sliding valve (not shown). The U-shaped hook clasp 165 is connected to the draining chute 170 through the use of U-shaped hook screws 175. The O-ring 173 creates a waterproof seal between the quick attach connector 160 and the quick connect sliding valve (not shown). The quick attach draining connector 160 provides a means for the user to quickly connect a hose (not shown) to the hanging potted plant system and drain the excess water to a distant location.

Figure 20:
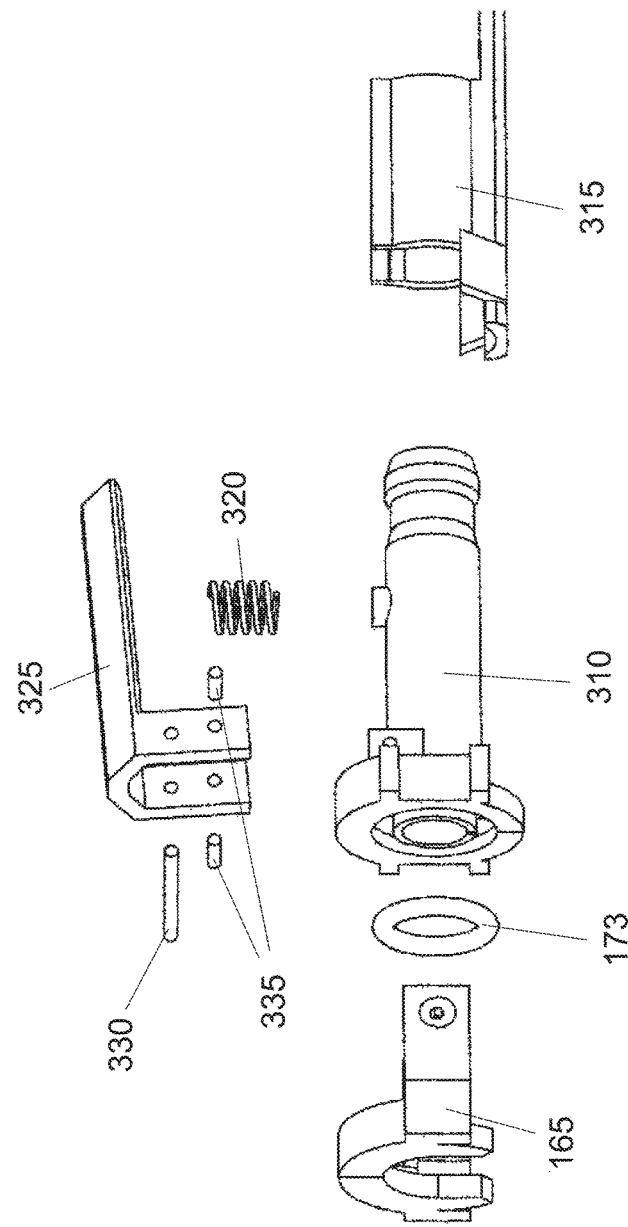
FIG. 20 is an exploded view of a spring loaded quick attach connector used in the potted plant system, one to another embodiment of the present invention.

With reference to FIG. 20 and according to one embodiment of the present invention the spring loaded quick attach connector 305 is shown. The spring loaded quick attach connector 305 is primarily comprised of: U-shaped hook clasp 165; O-ring 173; clasp body 310; clasp body holder 315; spring 320; lever 325; and large and small pins, 330 and 335, respectively. The lever 325, when compressing the spring pushes the U-shaped hook clasp forward providing space to slide onto the quick connect sliding valve (not shown). The O-ring 173 ensures that water does not leak when connected to the sliding valve (not shown). The clasp body 310 provides for a base for the other elements to affix, and the clasp body holder 315 clips onto the clasp body 310 and completes the spring loaded quick attach connector 305.

Figure 21B:
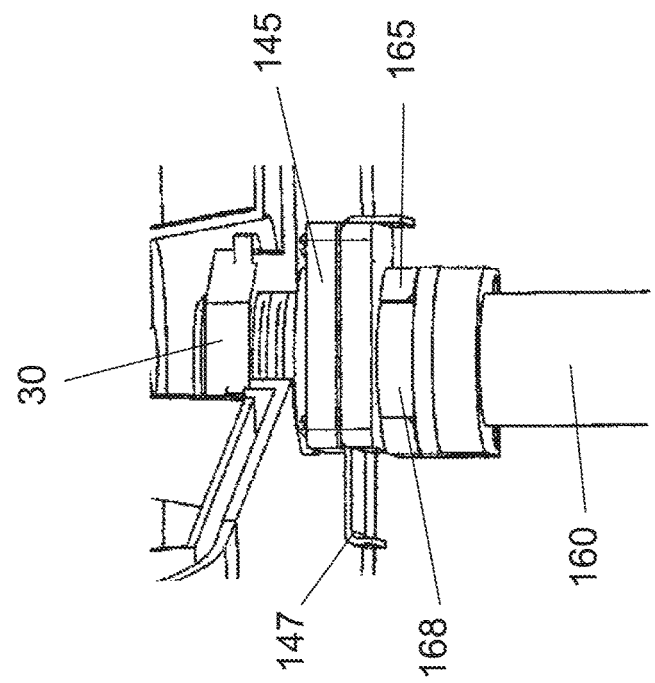
FIG. 21b is a magnified view of the quick connect sliding valve attached to both, the outer pot and to the quick attach connector, according to one embodiment of the present invention.
Figure 21A:
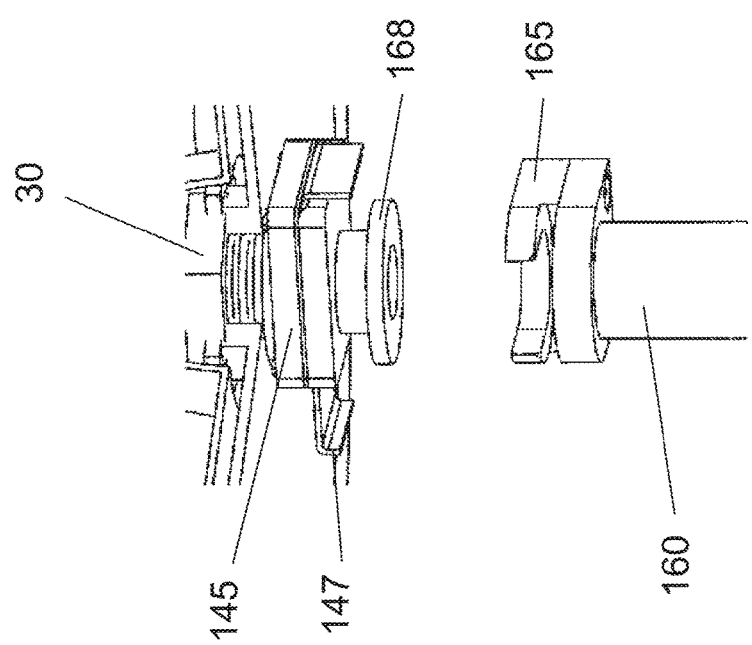
FIG. 21a is a magnified view of the quick connect sliding valve attached to the outer pot in close proximity to the quick attach connector, according to one embodiment of the present invention.

With reference to FIGS. 21a and 21b, and according to one embodiment of the present invention, the quick attach connector 160 attachment to the quick connect sliding valve 30 is shown. The quick attach connector 160 attaches to the outer neck enclosure 145 of the quick connect sliding valve 30. The outer neck enclosure 145 contains a neck 147 upon which the U-shaped hook clasp 165 couples too. The spacer beam 167 of the quick attach connector 160 provides for a gap that houses the neck frame 168 of the outer neck enclosure 145. With specific reference to FIG. 21b, the quick attach connector 160 is shown attached to the outer neck enclosure 145 of the quick connect sliding valve 30. The U-shaped hook clasp 165 couples around the neck 147 of the outer neck enclosure 145. The neck frame 168 of the outer neck enclosure 145 locks into the gap provided by the spacer beam 167 and prevents the quick attach connector 160 from sliding.

Figure 23:
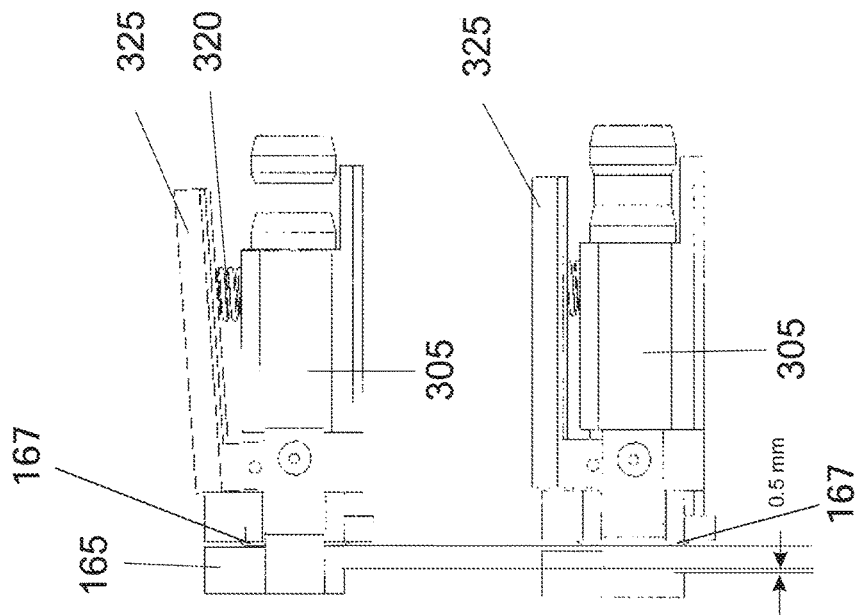
FIG. 23 is a perspective view of the spring loaded quick attach connector in open and closed position, according to one embodiment of the present invention.
Figure 22:
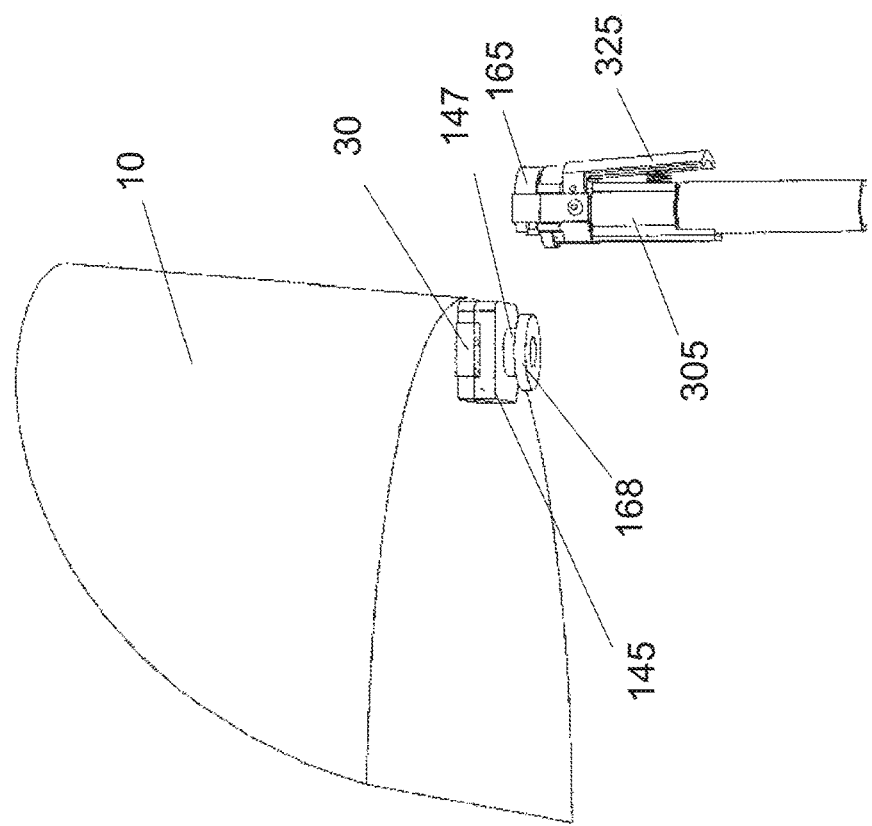
FIG. 22 is a magnified view of the quick connect sliding valve attached to the outer pot in close proximity to the spring loaded quick attach connector, according to one embodiment of the present invention.

With reference to FIGS. 22 and 23, and according to one embodiment of the present invention, the spring loaded quick attach connector 305 is shown in the process of attachment to the quick connect sliding valve 30. With specific reference to FIG. 22, the bottom of a hanging potted plant system 10 is shown. The outer neck enclosure 145 contains a neck 146 upon which the U-shaped hook clasp 165 couples too. To couple the U-shaped hook clasp 165 to the neck 146 of the quick connect sliding valve 30 the U-shaped hook clasp 165 is extended forward by pressing of the lever 325. With specific reference to FIG. 23, the extension of the U-shaped hook clasp 165 is shown. The compression of the spring 320 through the depression of the lever 325 extends the U-shape hook clasp 165, thereby opening the spacer beam 167 that locks into the neck frame of the quick connect sliding valve (not shown). The extension of the U-shaped hook clasp 165 provides for a spacer beam 167 of 0.5 mm. A worker skilled in the relevant art would appreciate that the extension gap can be in a range from 0.2 mm to 5 cm.

Figure 25:
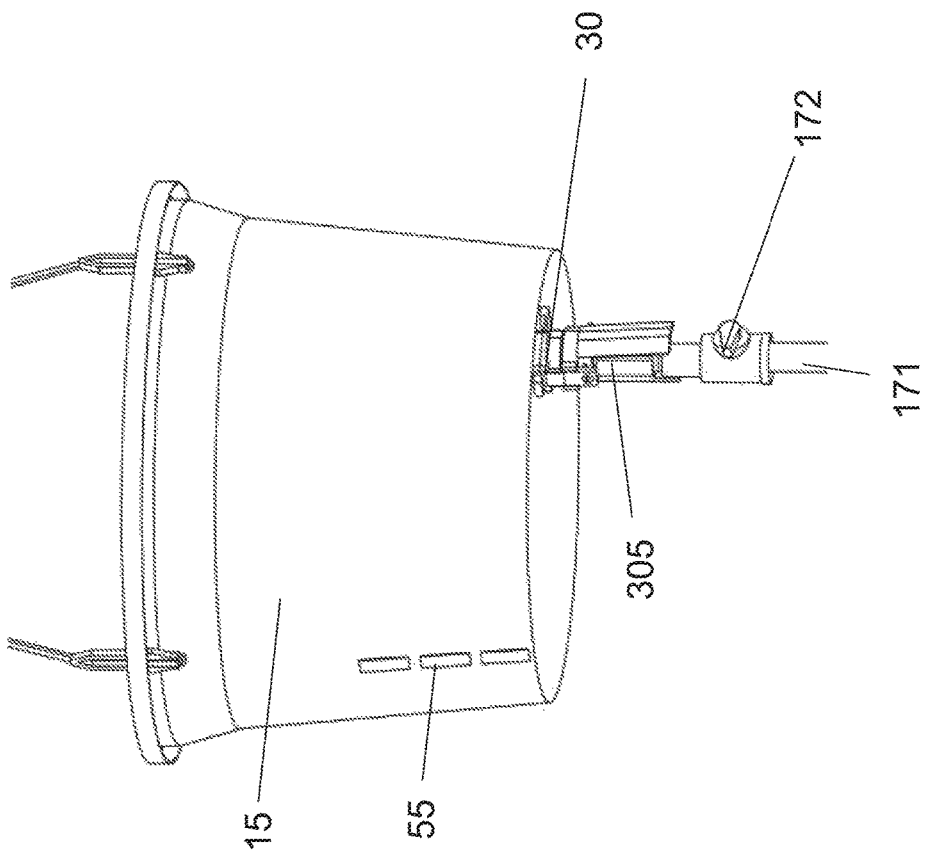
FIG. 25 is a perspective view of a hung potted plant system fitted with the quick connect sliding valve, a quick attach connector, a hose connector valve and a hose, according to one embodiment of the present invention.

With reference to FIGS. 24 and 25 and according to one embodiment of the present invention, a magnified image of the quick connect sliding valve 30 is shown attaching to a hose 171 through the hose connector valve 172. FIGS. 25a and 25b illustrate the attachment of the hose 171 through the hose connector valve 172 to a quick connect sliding valve 30 when positioned on the side of the outer pot (not shown). The hose connector valve 172 slides onto the quick connect sliding valve 30 thereby providing a water tight seal. The hose connector valve 172 allows the quick connect sliding valve 30 to be open at all times, as the connector valve 172 can be open or closed. The hose connector valve 172 is attached to a hose 171 which displaces the water from the potted plant system (not shown) to a bucket or a drain (not shown) when the hose connector valve 172 and the quick connect sliding valve 30 are opened. With specific reference to FIG. 25, the quick connect sliding valve 30 is shown positioned at the bottom of the outer pot 15. The hose connector valve 172 is attached to the quick connect sliding valve 30 in a similar fashion thereby allowing excess water to escape then the draining connector 172 and the quick connect sliding valve 30 are opened.

Figure 26:
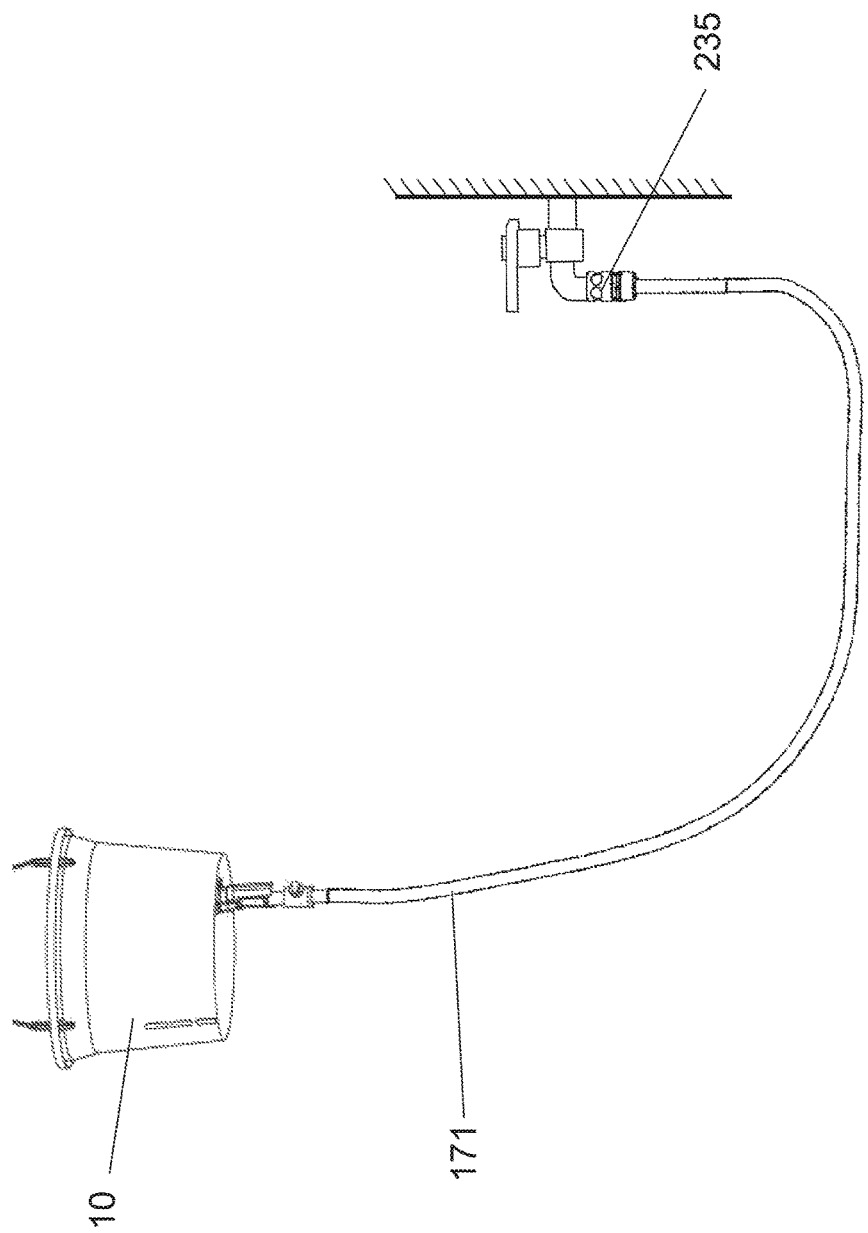
FIG. 26 is a perspective view of the potted plant system attached to a water tap supply source, according to one embodiment of the present invention.

With reference to FIG. 26 and according to one embodiment of the present invention, the potted plant system 10 is shown connected to a water source. A hose 171 attaches to a water source like a tap water runs through the water tap to the hose connector valve 172. The water pressure exiting a tap is high and would cause some damage to the potted plant system 10 if allowed to enter the outer pot 15 with the same pressure. As such, the hose connector valve 172 contains valves that reduce the water pressure and allow the water to enter the outer pot 15 at a lower pressure.

Figure 27:
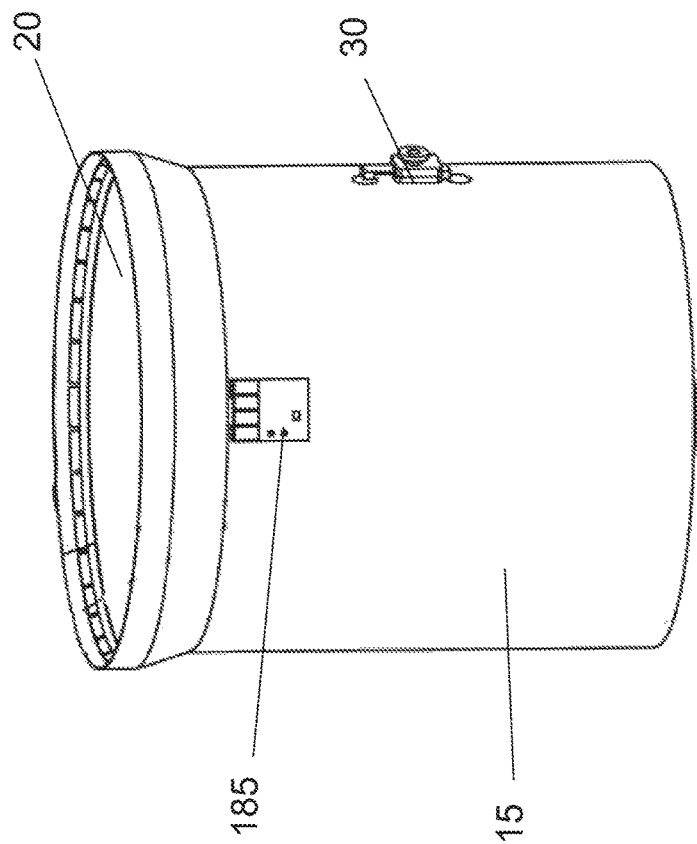
FIG. 27 is a perspective view of a potted plant system operating with a water monitor, according to one embodiment of the present invention.
Figure 28A:
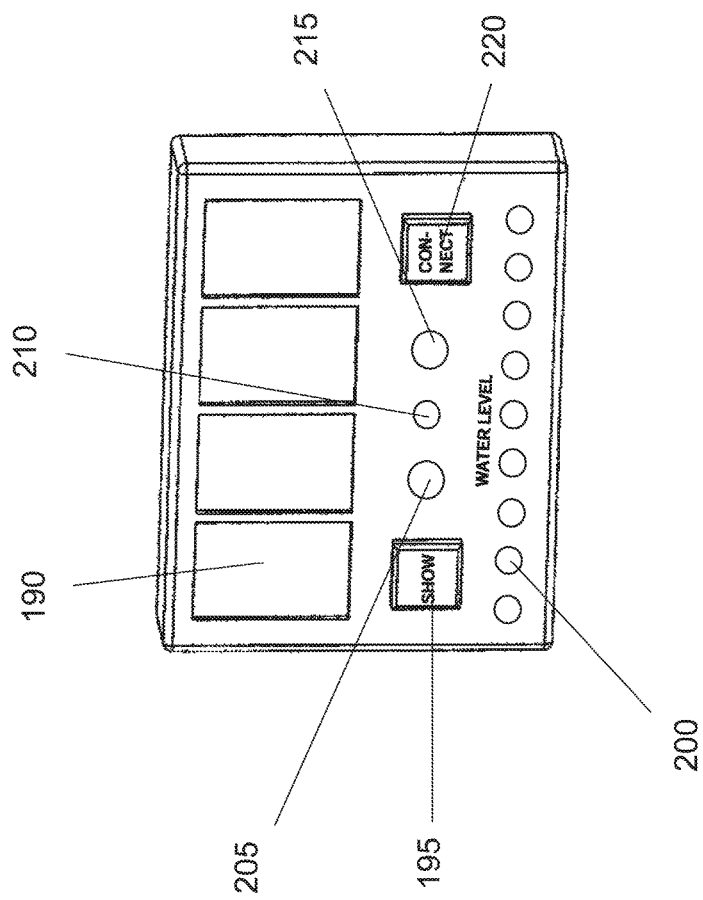
FIG. 28a is a magnified perspective view of a water monitor, according to one embodiment of the present invention.
Figure 28C:
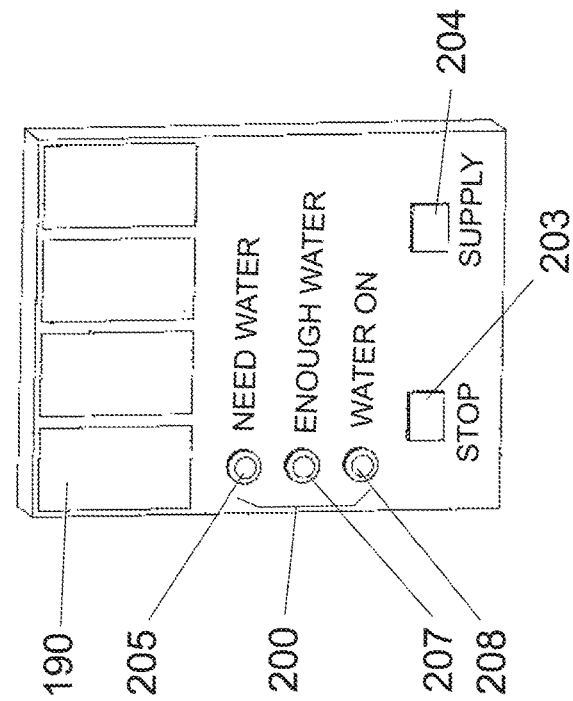
FIG. 28c is a magnified perspective view of a water monitor with a supply connection, according to another embodiment of the present invention.
Figure 28B:
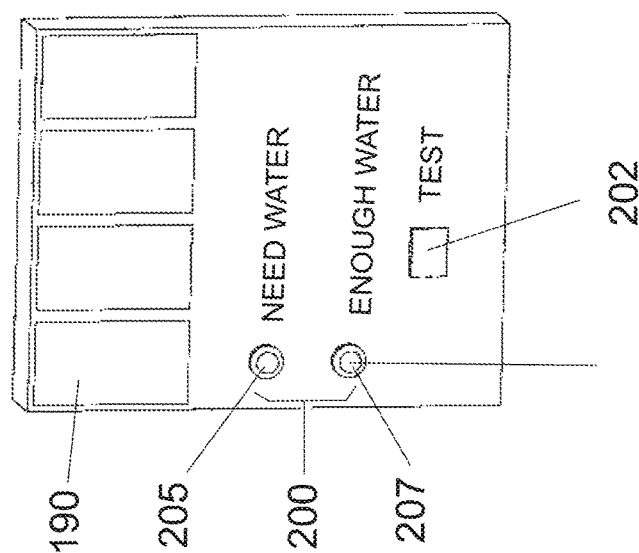
FIG. 28b is a magnified perspective view of a water monitor with a test button, according to another embodiment of the present invention.

With reference to FIGS. 27 and 28 and according to one embodiment of the present invention, the potted plant system 10 is shown with the attached water monitor 185. The water monitor 185 is a electric device that replaces the water level indicator (not shown). The water monitor 185 can assesses the water level within the reservoir (not shown), which is the space between the outer and inner pots, 15 and 20 respectively, and display the water level on an easy to ready display. The water monitor 185 is placed on the outer part of the outer pot 15 where it can read by the user. Upon analysis of the water monitor 185, the user can add more water or expel water through the quick connect sliding valve 30. With specific reference to FIG. 28a, a magnified view of a water monitor 185 is shown. The water monitor 185 operates through an electrical circuit and obtains an electrical current through light received by the solar cells 190. To determine the amount of water within the reservoir, the user presses the indicator button 195 which lights up the water indicator level 200. To eliminate issues with too much water or no water, the water monitor 185 contains a no water indicator 205 and a too much water indicator 210. The user is not required to press the indicator button 195 to determine whether there is no water or if there is too much water. The no water indicator 205 and too much water indicator 210 lights up automatically when the water level within the reservoir reaches certain limits. With specific reference to FIG. 28b and according to one embodiment of the present invention, a modified water monitor 185 is shown. The modified water monitor 185 contains the solar cells 190, a simplified water indicator level 200 and a test button 202. Based on the information provided the water monitor 185 will indicate through the indicator level 200 that the reservoir within the potted plant system (not shown) needs water or contains sufficient water. If the reservoir (not shown) needs water, then the need water indicator 205 will illuminate. If the reservoir (not shown) has sufficient water, then the enough water indicator 207 will illuminate. The test button 202 provides the user with the ability to ensure that the water monitor 185 is working. A worker skilled in the relevant would appreciate the various means that the test button 202 would ensure that all the illumination is working on the water monitor 185. The water monitor 185 can be wirelessly linked to other devices through a Bluetooth or Wi-Fi connection. A worker skilled in the relevant art would appreciate the various means to wirelessly connect to electronic devices. A wireless connection provides a means of providing a system which automatically adds water to the potted plant system (not shown) upon the water monitor 185 determining the water level is too low. The LED connection indicator 210 will light up once the water monitor 185 is wirelessly connected to another device. With specific reference to FIG. 28c a water monitor 185 wirelessly connected to a water source (not shown) is shown. In addition to the need water 205 and enough water 207 indicators, the water monitor 185 contains an additional illumination, the water connection 208 indicator to denote to the user that the water source is connected. The test button (not shown) is replaced with the stop and supply buttons, 203 and 204, respectively. The stop button 203 directs the water source connection (not shown) to stop providing water to the potted plant system (not shown), while the supply button 204 directs the water source connection (not shown) to start providing water to the potted plant system (not shown).

Figure 29B:
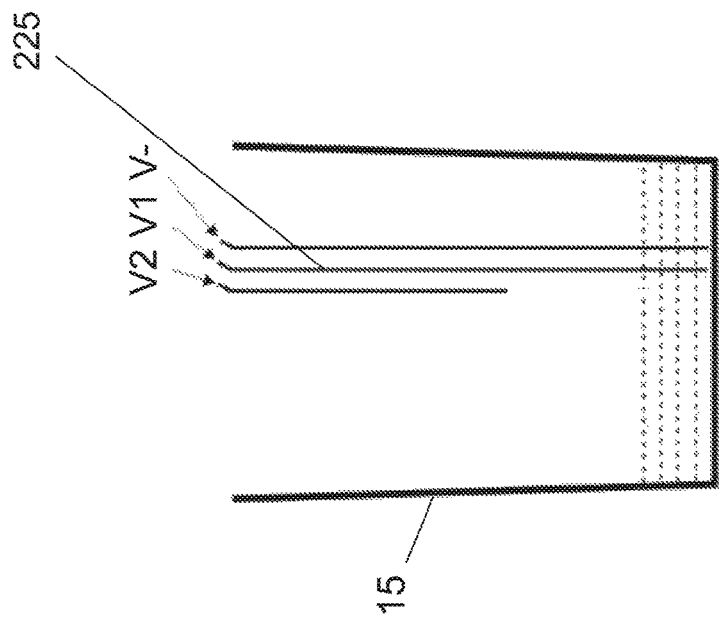
FIG. 29b is an illustration of the electric connection strips, according to one embodiment of the present invention.
Figure 29A:
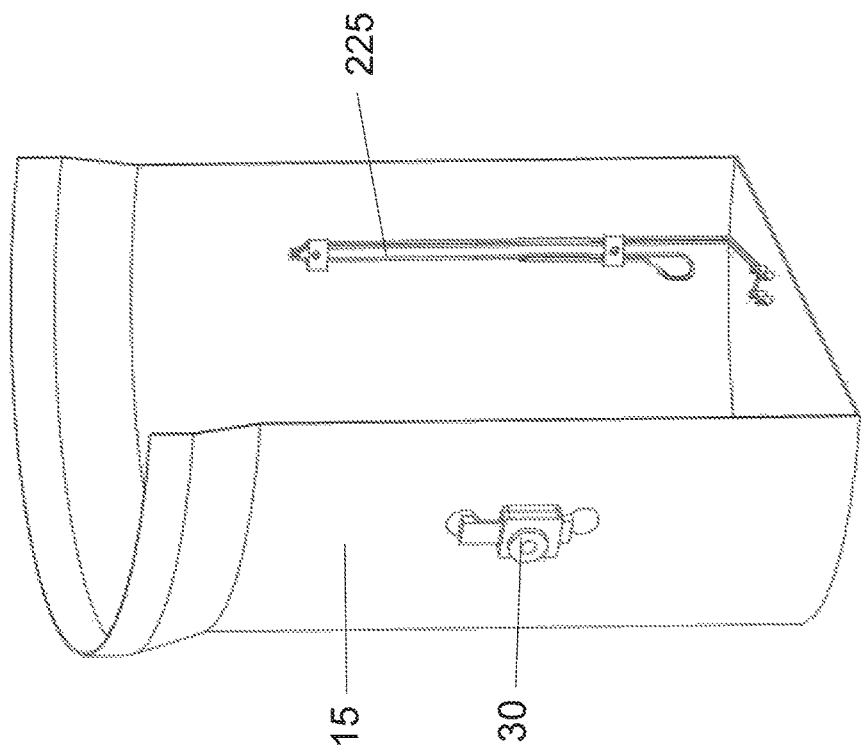
FIG. 29a is a perspective cut-out view of an outer pot fitted with the electric connection strips, according to one embodiment of the present invention.

With reference to FIG. 29, and according to one embodiment of the present invention, the electronic ribbon cable 225 is shown. The electronic ribbon cable 225 is used to electronically indicate the water level within the outer pot 15. The electronic ribbon cable 225 connects to the water monitor (not shown) and provides the water level within the reservoir. With specific reference to FIG. 30a, a cut out of the outer pot 15 is shown to illustrate the location of the electronic ribbon cable 225. The information that is sent from the electronic ribbon cable 225 is displayed on the water monitor (not shown) to determine the water level. The electronic ribbon cable 225 is a set of wires of various lengths that extend to the bottom of the outer pot 15. The bottom of the wires within the ribbon cable 225 are exposed. With specific reference to FIG. 29b, an electric schematic of the electronic ribbon cable 225 is shown within the outer pot 15. As water enters the water reservoir and rises it makes contact in succession with the various exposed wires within the electronic ribbon cable 225. As water makes contact with a wire, it completes the circuit of the single wire and thus illuminates a single light on the water monitor (not shown) to indicate the water has reached that level. As water rises within the water reservoir more wires come into contact with the water, thereby completing more electric circuits and lighting up more led lights within the water monitor (not shown). A series of lights on the water monitor (not shown) correspond to each wire on the electronic ribbon cable 225, and as such, indicate the amount of water within the reservoir. A worker skilled in the relevant art would appreciate that electronic ribbon cable 225 is not only one way of indicating water level within the outer pot 15. As such, a worker skilled in the relevant art would appreciate the various means of electronically or mechanically indicating the water level within the water reservoir of the outer pot 15.

Figure 30C:
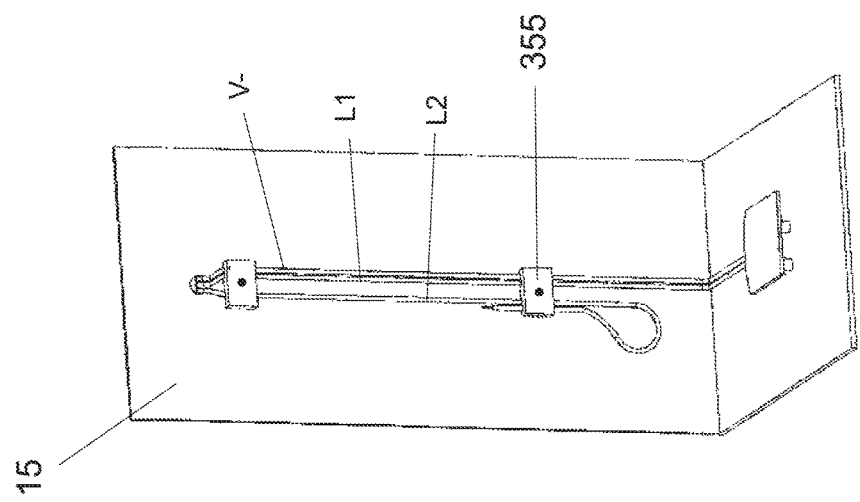
FIG. 30c is a perspective cut-out view of the water detection mechanism, according to one embodiment of the present invention.
Figure 30B:
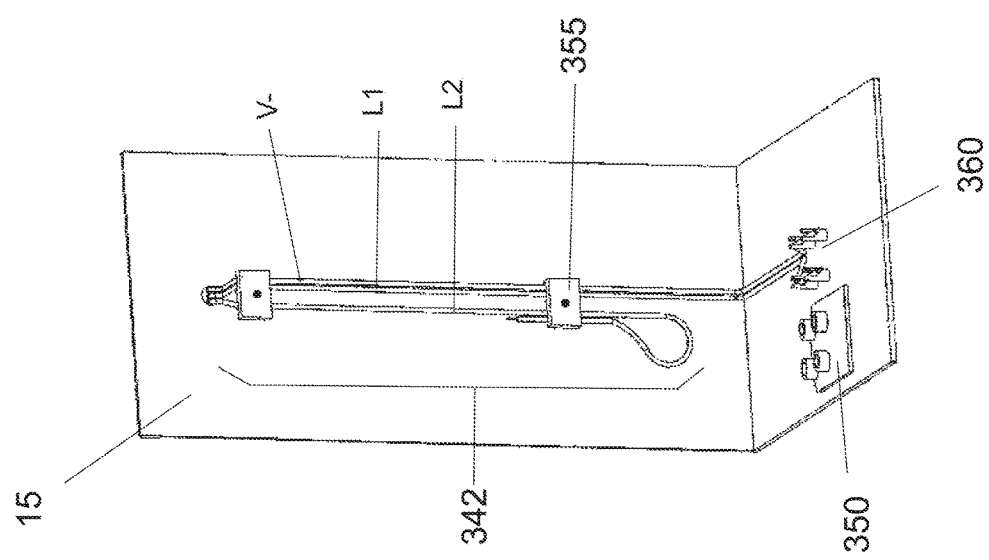
FIG. 30b is a perspective cut-out view of the water detection mechanism with protection cover removed, according to one embodiment of the present invention.

With reference to FIG. 30, and according to one embodiment of the present invention, the base of the water monitor 185 installed on the top front of the outer pot 15. With specific reference to FIG. 31a the outer portion of the water monitor (not shown) is shown with the display screen removed. The base contains a male connector 340 that attaches to the display screen (not shown). The male connector contains 3 wires that connects to the display screen of the water monitor (not shown) to provide the information relating to the water level in the reservoir (not shown). The display screen (not shown) is connected to the base through a female connection (not shown) to the male connector 340 and is affixed by a display attachment means 341. A worker skilled in the relevant art would appreciate the various male and female connection configurations that incorporate the attachment of wires that conduct electricity. A worker skilled in the relevant art would also appreciate the various means of connecting the display base through a display attachment means, including but not limited to: plug system; nut and bolt; adhesive material; mating of male and female ends; and clasps. With specific reference to FIG. 30b, the inner portion of the display water monitor 185 is shown with the protection cover 350 removed. The water monitor 185 contains at least 3 wires that form the water detection mechanism 342. The water detection mechanism 342 contains-wires V−, L1 and L2 positioned at the bottom of the outer pot 15. The three wires are further attached to the inner wall of the outer pot 15 at the lower portion with a detection bracket 355. Wire L2 is looped underneath the detection bracket 355 and can be pulled up to different levels. The water detection mechanism 342 provides sufficient information to the water monitor 185 to indicate: 1. No water in the reservoir of the outer pot 15; 2. water present within the reservoir of the outer pot 15; and, 3. maximum water level reached within the reservoir of the outer pot 15. The varying position of Wire L2 adjusts the vertical location of the maximum water level of the reservoir within the outer pot 15. Wires V− and L1 monitor water presence at the bottom of the flowerpot they are placed several mm above the bottom of the outer pot 15. Pillars 360 are used to raise the wires V− and L1. A worker skilled in the relevant art would appreciate the various means of raising wires from the base of the out pot 15. The function of wires V− and L1 monitor presence of water in the reservoir through forming an electrical connection. In the absence of water, V− and L1 are not in electrical communication with each other, and thus do not form a connection. As water enters the reservoir, it immerses V− and L1 wires and thereby providing an electrical connection. The electrical connection of V− and L1 signals to the water monitor 185 the presence of water within the reservoir of the outer pot 15. The Protection cover 350 mounts onto the water detection mechanism 342 through its interaction with the pillars 360. With specific reference to FIG. 30c, the inner portion of the display water monitor 185 is shown with the protection cover 350 attached. The wires V− and L1 protected with the cover 315 against falling dirt and are raised from the ground to limit false positive signals through communication with puddles pooling at the bottom of the outer pot 15.

Figure 31C:
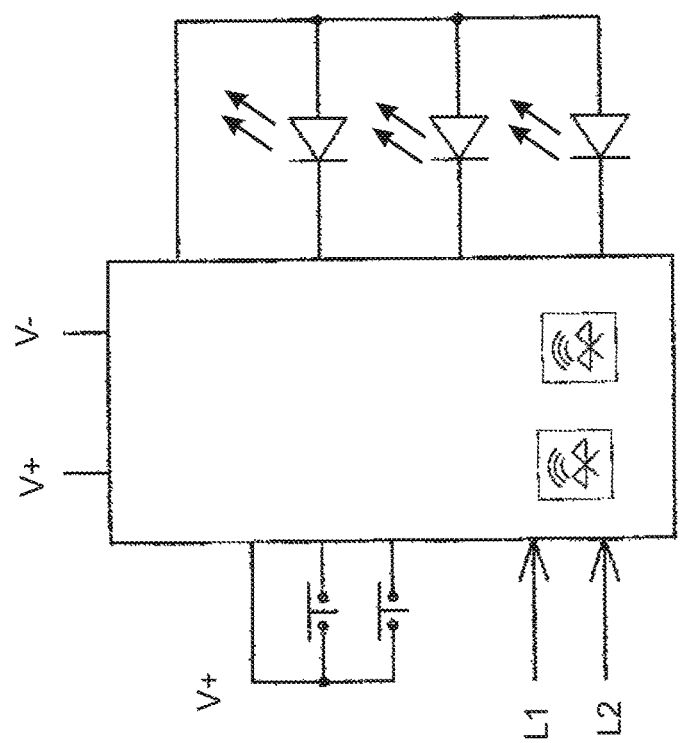
FIG. 31c is a schematic of the electrical circuit for the water monitor in the potted plant system, according to one embodiment of the present invention.

With specific reference to FIGS. 31a, 31b and 31c and according to one embodiment of the present invention, the electrical circuit is shown relating to the water monitor. With specific reference to FIG. 31a, a power supply for the water monitor is shown and can be any known power supply known by a worker skilled in the relevant art. With reference to FIGS. 31b and 31c, the power source from FIG. 31a is connected to an electrical diagram with various Bluetooth connections that connect and operate valves as would be known by a worker skilled in the relevant. The electrical configuration of the water monitor 185 as shown in FIG. 31 is based on the knowledge of a worker skilled in the relevant art.

Figure 32:
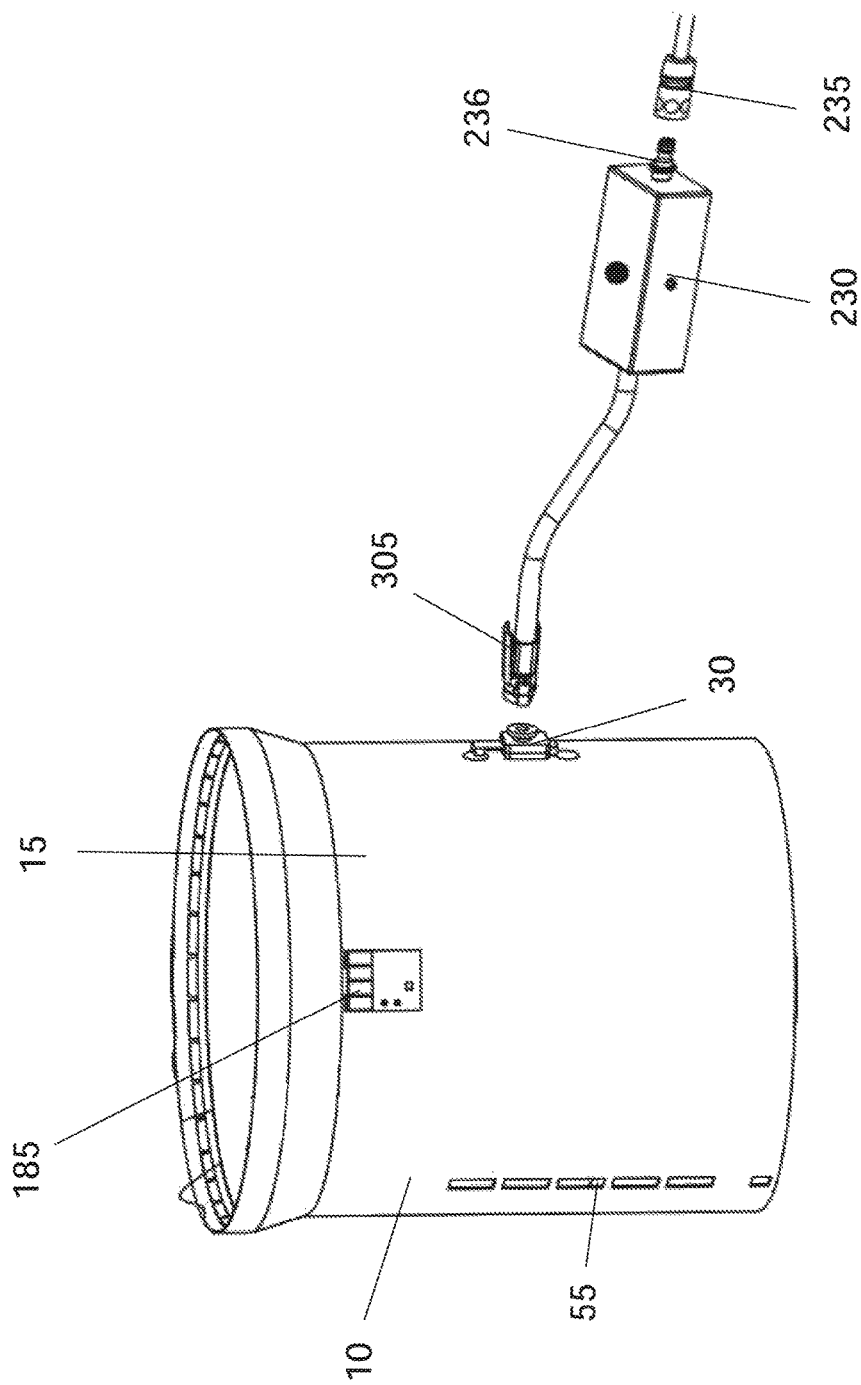
FIG. 32 is a perspective view of a potted plant system attached to the remotely controlled water supply unit, according to one embodiment of the present invention.
Figure 33A:
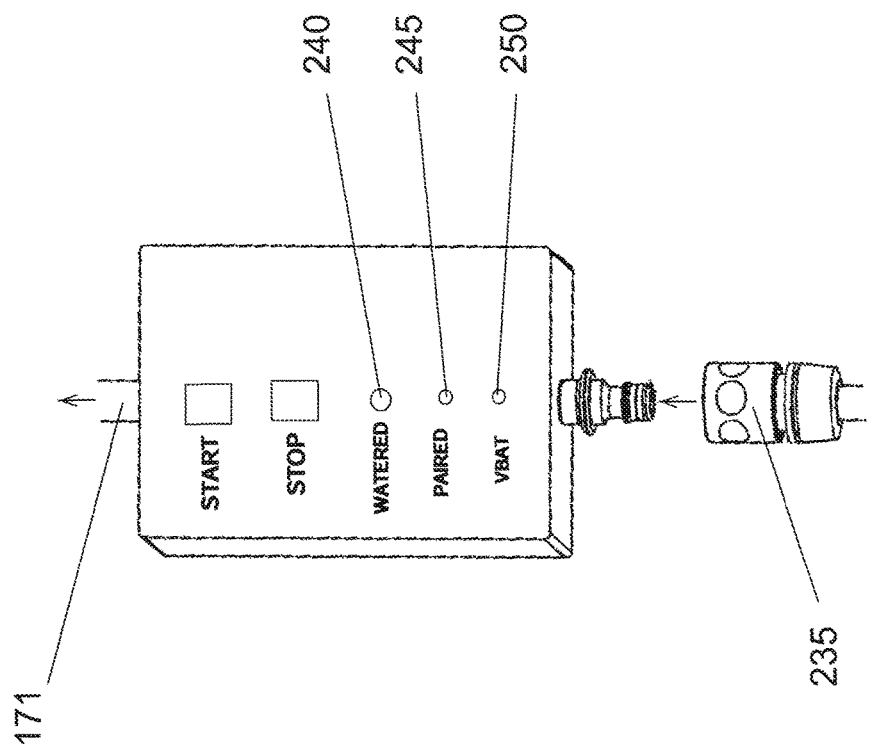
FIG. 33a is a perspective view of a remotely controlled water supply unit, according to one embodiment of the present invention.
Figure 33B:
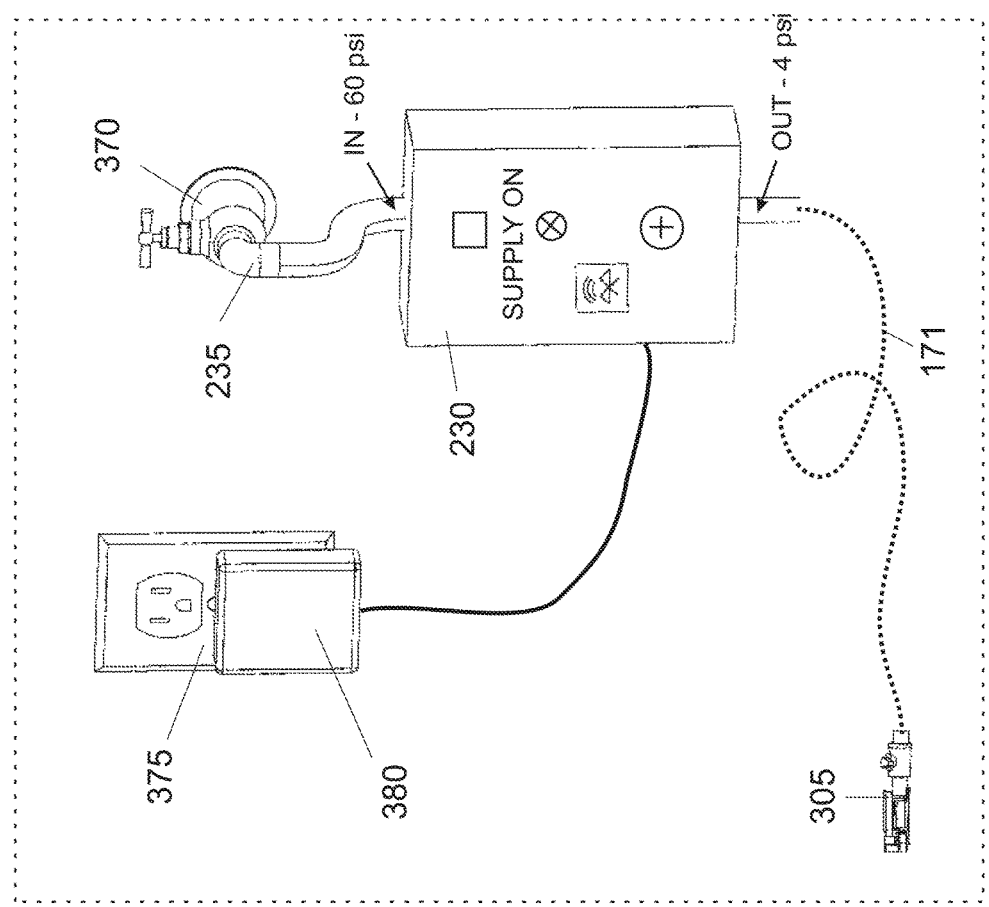
FIG. 33b is a perspective view of a remotely controlled water supply unit connected to a water source, according to one embodiment of the present invention.
Figure 33C:
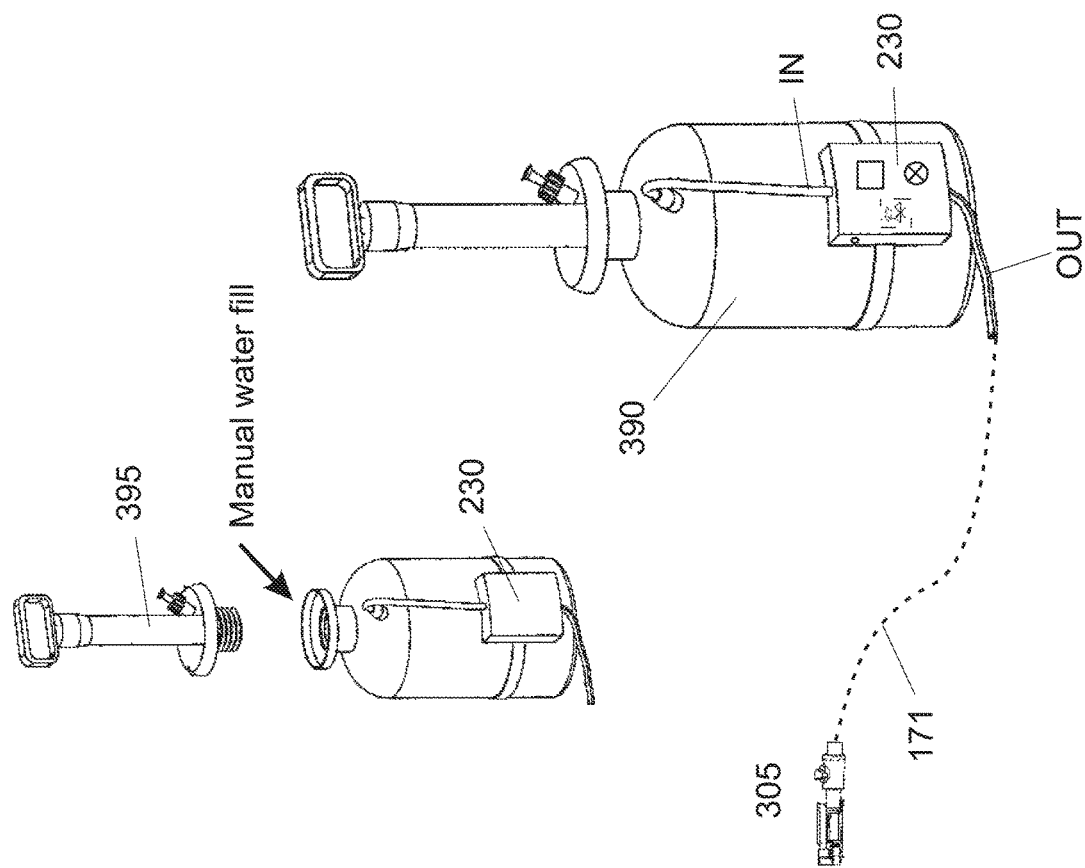
FIG. 33c is a perspective view of a remotely controlled water supply unit connected to manual pressure pump canister, according to one embodiment of the present invention.
Figure 33D:
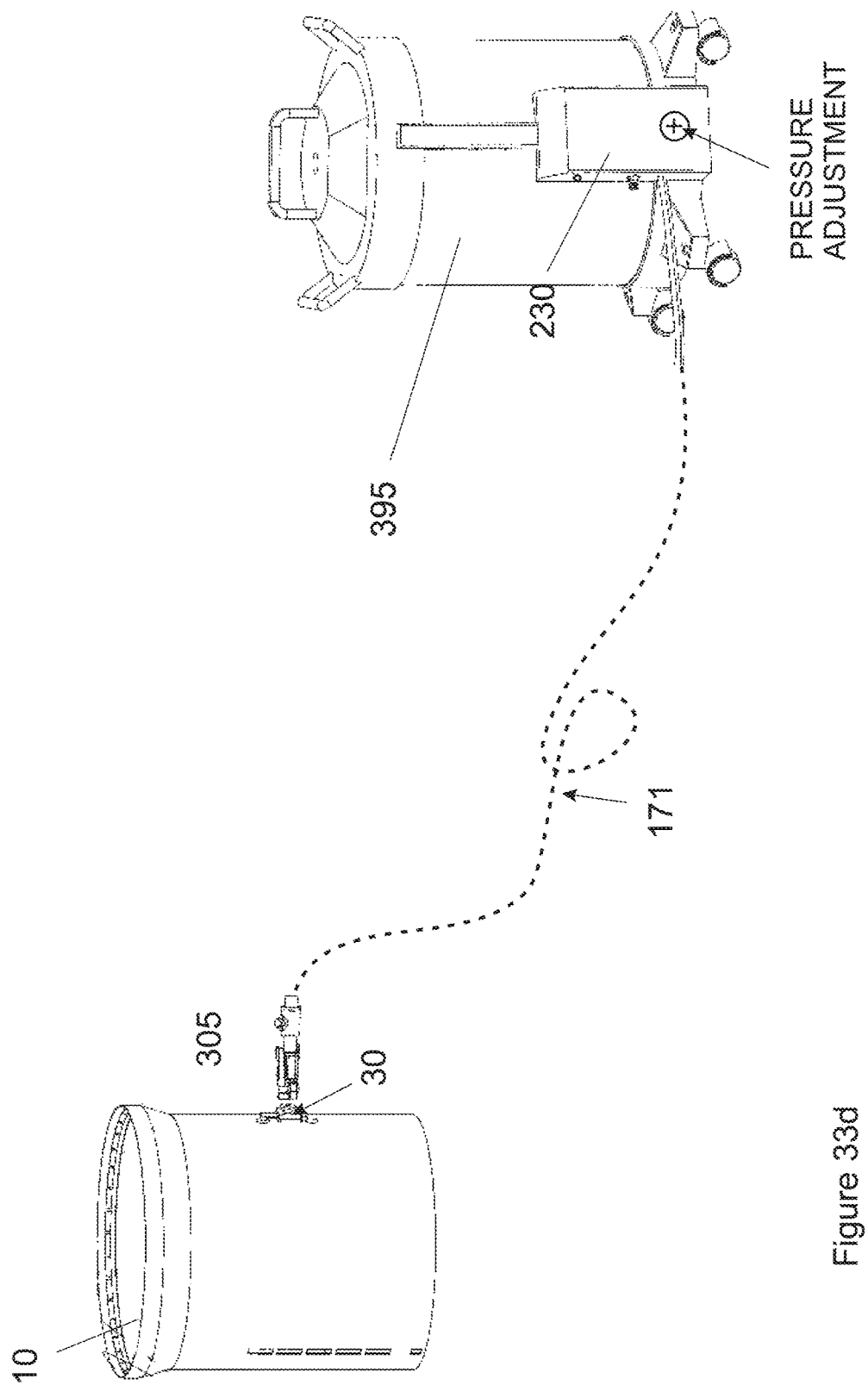
FIG. 33d is a perspective view of a remotely controlled water supply unit connected to vacuum pressure pot, according to one embodiment of the present invention.

With specific reference to FIGS. 32 and 33 and according to one embodiment of the present invention, the remotely controlled water supply unit 230 is shown operating within the potted plant system 10. The remotely controlled water supply unit 230 wirelessly connects with the water monitor 185 to determine the water level within the reservoir of the outer pot 15. Based on the water level within the water reservoir, the remotely controlled water supply unit 230 determines whether to automatically add water to the potted plat system 10. The remotely controlled water supply unit 230 has a water supply connector 236 which can be quickly connected to a water supply and water lines 235. The remotely controlled water supply unit 230 is powered by a rechargeable battery that is recharged through a power jack and current regulator from the household electrical power charger. When turned on and wirelessly connected to the water monitor 185, the remotely controlled water supply unit 230 can automatically add water from the water supply into the reservoir of the outer pot 15, through the open quick connect sliding valve 30. Upon receiving a too low signal from the water monitor 185 the remotely controlled water supply unit 230 opens the internal solenoid valve and allows water to enter the outer pot 15 and refill the reservoir. A worker skilled in the relevant art would appreciate the various means of opening and closing a water supply from entering the outer pot 15. As water enters the outer pot 15, the water monitor 185 continues to monitor the water level and send a stop signal to the remotely controlled water supply unit 230 once the water level has reached a desired height. Upon receiving a stop signal, the remotely controlled water supply unit 230 closes the internal solenoid valve and stops water from flowing from the water source to the outer pot 15. As such, the user no longer is involved in the watering process, as additional watering is achieved through: 1. detection of low water within the reservoir by the water monitor 185; 2. the transmission of low water to the remotely controlled water supply unit 230; 3. the opening of the remotely controlled water supply unit 230 internal valve to allow water to pass from the water source to the outer pot 15; 4. the detection of water filling the outer pot 15; 5. the detection by the water monitor 185 that water level has reached a desired height within the outer pot 15; 6. The transmission of a sufficient water to the remotely controlled water supply unit 230; 7. the closing of the remotely controlled water supply unit 230 internal valve to cease water flow from entering the outer pot 15. With specific reference to FIG. 32, the connection of the water source (not shown) to the potted plant system 10 is shown. The water monitor 185 is attached to the outside of the outer pot 15 which wirelessly communicates with water supply unit 230. The water supply unit is connected to the water line 235 via the water supply connector 336. The water supply unit is subsequently connected to the potted plant system 10 via the spring loaded quick attach connector 305 thus supplying water to the reservoir (not shown) through the quick connect sliding valve 30. The water level indicator 55 is shown and can be used as a manual reference of the water level in the reservoir by the user. With specific reference to FIG. 33*a*, the water supply unit 230 is shown. The water supply unit 230 contains a number of indicators that alert the user to the watering status of the potted plant system (not shown). The user can quickly determine if the potted plant system (not shown) is watered. The water supply unit 230 also provides an indicator as to the Bluetooth connection to the water monitor (not shown) and the battery status. The water supply unit 230 is connected to the hose 171 and to the water line 235. With specific reference to 33*b* the water supply unit 230 is shown attached to the water source 370 via water line 235. The water supply unit 230 is powered through an electrical connection through the wall plug 375 and the water supply unit cable 380. The water pressure coming from the water source 370 is much higher than what is required to safely fill the reservoir (not shown). The water supply unit 230 modulates the water pressure so that the water pressure entering the hose 171 and the spring loaded quick attach connector 305 is much lower, at or around 4 psi. As such, the water pressure entering the reservoir (not shown) is at a safe level. With specific reference to FIG. 33*c*, the water source depicted is a manual pressure pump canister 390. The manual pressure pump canister 390 is used when a water source (not shown) is not readily available. The manual pressure pump canister 390 is filled with water by the user. This is accomplished by the user bringing the manual pressure pump canister to the to a water source (not shown) and removing the pump cap 395. Once full, the manual pressure pump canister has pressure increased manually through the pumping action of the pump cap 395. A worker skilled in the relevant art would appreciate the various means of increasing the pressure in a canister. Once pressure is increased the water supply unit 230 operates in the same mechanism as described when connected directly to a water source (not shown). With specific reference to FIG. 33*d* the water source is depicted is a vacuum pressure pot 395. The vacuum pressure pot 395 is used when a water source (not shown) is not readily available but is in close proximity to an electrical outlet (not shown). The vacuum pressure pot 395 is manually filled with water (not shown) by rolling the vacuum pressure pot 395 to the water source. Once full, the vacuum pressure pot 395 is sealed and pressure is increased to 60 psi. the vacuum pressure pot 395 is connected to the potted plant system 10 through the spring loaded quick attach connector 305 and hose 171. The water supply unit decreased the pressure going to the potted plant system 10 to 4 psi. A worker skilled in the relevant art would appreciate the various means to decrease the pressure of water.

Figures 34A, 34B:
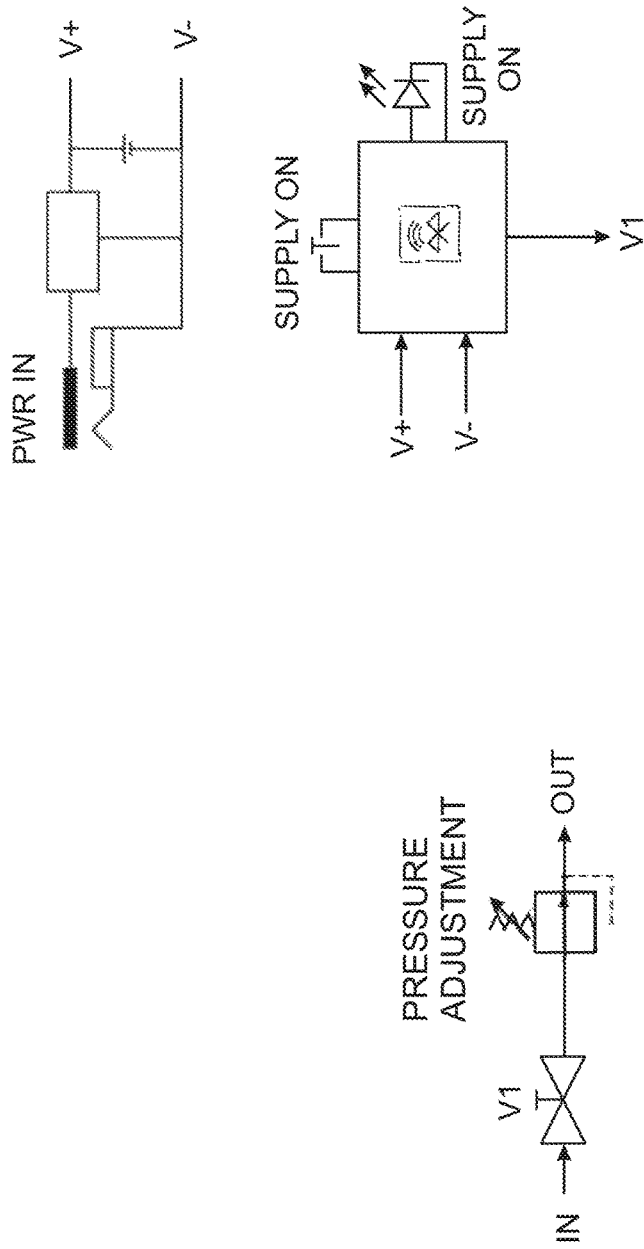
FIG. 34a is a schematic of the electrical circuit for a power source for the remotely controlled water supply unit, according to one embodiment of the present invention; and, FIG. 34b is a schematic of the electrical circuit of the remotely controlled water supply unit, according to one embodiment of the present invention.

With reference to FIGS. 34*a* and 34*b* the schematic mechanism of the pressure adjustment and supply modulator is shown. With specific reference to FIG. 34*a* describes the mechanism of altering the pressure through a valve and pressure adjustment apparatus. A worker skilled in the relevant art would appreciate the various means of modulating the pressure exiting the system. With specific reference to FIG. 34*b* the Bluetooth connection to turn on and off the water supplying unit to fill reservoir in the potted plant system (not shown) is shown. Once water level reaches the user defined maximum level within the reservoir, a Bluetooth signal is sent to the water supply unit and the supply is turned off.

Figure 35B:
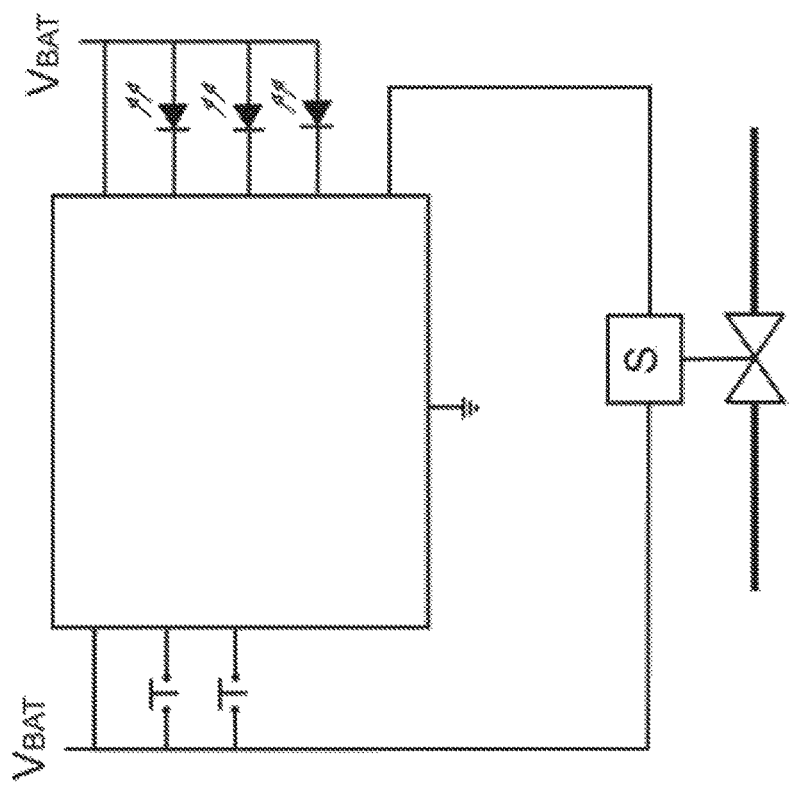
FIG. 35b is a schematic of the electrical circuit with a valve sensor powered through a battery source, according to one embodiment of the present invention.
Figure 35A:
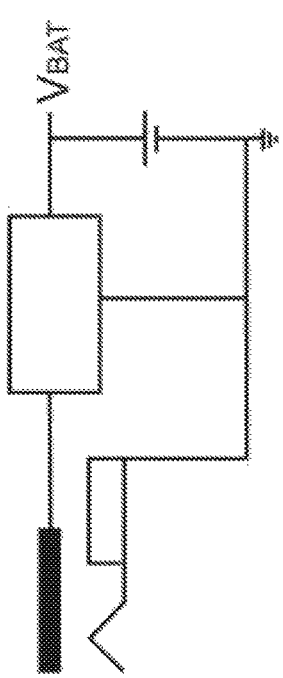
FIG. 35a is a schematic of the electrical circuit of the rechargeable battery supply, according to one embodiment of the present invention.

With specific reference to FIGS. 35*a* and 35*b* and according to one embodiment of the present invention, the electrical circuit is shown relating to the remotely controlled water supply unit. With specific reference to FIG. 35*a*, a battery source is shown and can be any known power source as would be known by a worker skilled in the relevant art. With reference to FIG. 35*b*, the power source from FIG. 35*a* is connected to an electrical diagram as would be known by a worker skilled in the relevant. The electrical configuration of the remotely controlled water supply unit as shown in FIG. 35 is based on the knowledge of a worker skilled in the relevant art.

Figure 37:
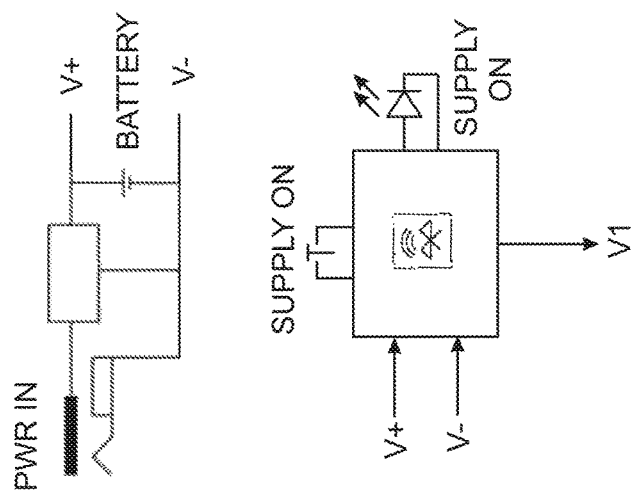
FIG. 37 is a schematic of the electrical circuit of the water supply of the manual pressure pump canister of the water filling system, according to one embodiment of the present invention.
Figure 36:
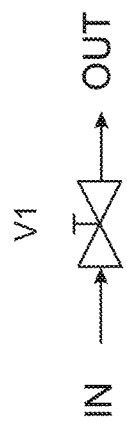
FIG. 36 is a schematic of the valve switch system, according to one embodiment of the present invention.

With reference to FIGS. 36 and 37 the schematic mechanism of the pressure adjustment and supply modulator is shown. With specific reference to FIG. 36 describes the valve that modulates the flow of water from the water source (not shown). A worker skilled in the relevant art would appreciate the various valve mechanism to modulate the flow from the water source (not shown). With specific reference to FIG. 37 the Bluetooth connection to turn on and off the water supplying unit to fill reservoir in the potted plant system (not shown) is shown. Once water level reaches the user defined maximum level within the reservoir, a Bluetooth signal is sent to the water supply unit and the supply is turned off. The electrical schematic outlines a battery as a power source.

Figure 39:
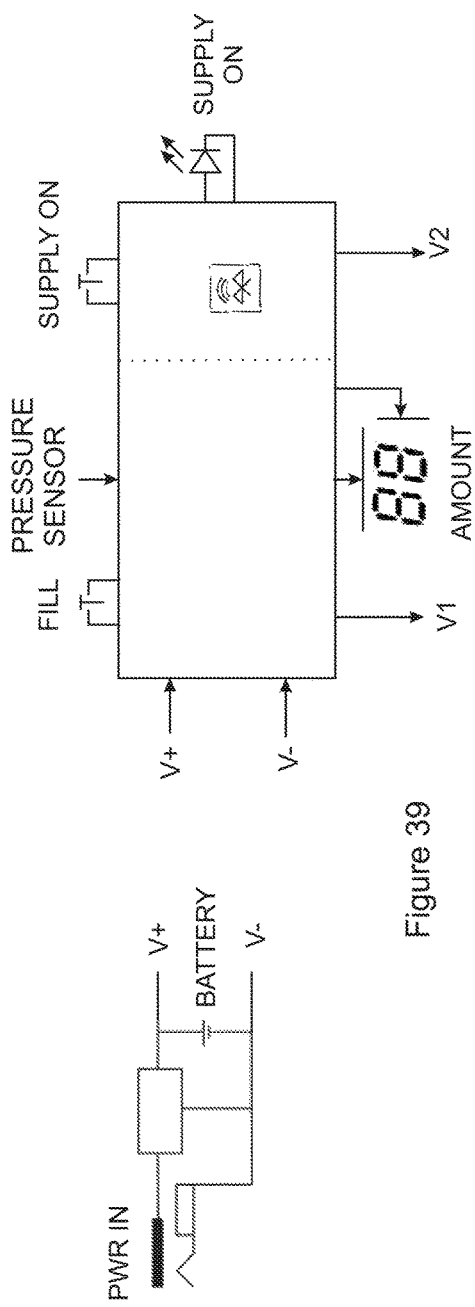
FIG. 39 is a schematic of the electrical circuit of the vacuum pressure pot water filling system, according to once embodiment of the present invention; and, FIG. 40 is a schematic of the water pressure adjustment of pressure of the vacuum pressure pot water filling system to the pressure to fill the reservoir of the potted plant system, according to one embodiment of the present invention.
Figure 40:
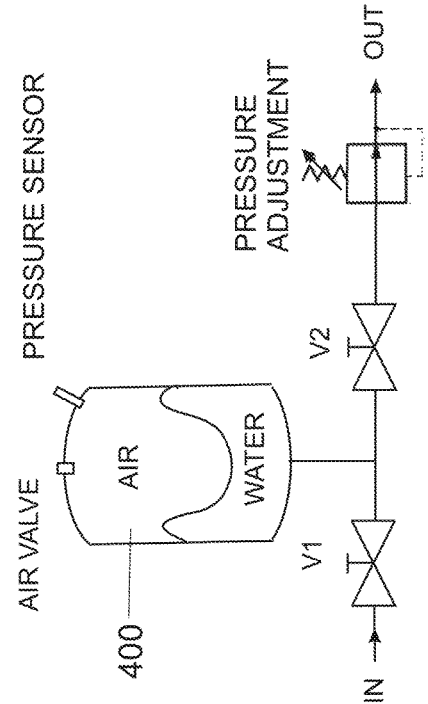
Figure 38:
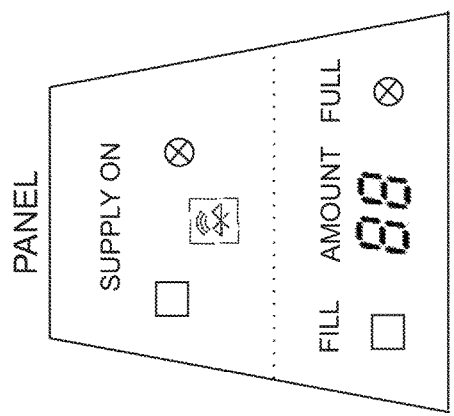
FIG. 38 is a perspective view of the electrical panel of the vacuum pressure pot water filling system, according to one embodiment of the present invention.

With reference to FIGS. 38, 39, and 40 the schematic diagrams of the electrical circuitry and pressure valve system of the vacuum pressure pot (not shown). The vacuum pressure pot (not shown) contains a pressurized tank with a diaphragm 400. The panel outlines to the user whether the supply is on and whether the vacuum pressure pot (not shown) is full or needs refilling. A digital display shows the amount of water remaining. With specific reference to FIG. 38 the panel of the vacuum pressure pot (not shown) is shown. With specific reference to FIG. 39, the pressure sensor schematic is shown. The fill the tank external hose is connected to IN (at high pressure). Valve V1 opens and the tank is filled with water. Pressure sensor 400 monitors the pressure in the tank. When the pressure reaches a set value the valve V1 is shut off. With specific reference to FIG. 40 the Bluetooth connection system along with the electrical power connection is described. The pressure sensor outlines the fill and supply signals along with the pressure sensor adjustments flowing to V1 and V2. The value is outlined in the digital display.

The invention claimed is:

1. A potted plant system comprising:
   an outer pot and an inner pot, the outer pot configured to receive the inner pot;
   an outer shoulder of the outer pot that interacts with an inner pot shelf to support and suspend the inner pot wherein
      suspension of the inner pot by the outer pot creates a reservoir that is in fluid connection with the inner pot;
      fluid is passively diffused between the reservoir and the inner pot;
   a quick connect sliding valve positioned on the outer pot to alter a fluid level within the reservoir, wherein
      the quick connect sliding valve positioned within the outer pot to maintain a predetermined fluid level from being displaced from within the reservoir;
   outer edge channels of the inner pot providing fluid access to the reservoir from an outer surface of the inner pot; and
   fins positioned on the outer surface of the inner pot to provide a fluid passage gap to facilitate fluid passage from the outer surface of the inner pot into the reservoir;
wherein the potted plant system provides an efficient fluid transfer system that ensures the fluid level within reservoir is maintained, which thereby provides a passive transfer of the fluid to the potted plant housed in the inner pot.

2. The potted plant system of claim 1, further comprising a water level adaptor connected to the quick connect sliding valve and positioned within the outer pot to increase volume of water in the reservoir.

3. The potted plant system of claim 1, wherein quick connect sliding valve is positioned on a side wall of the outer pot.

4. The potted plant system of claim 1, wherein quick connect sliding valve is positioned on a bottom of the outer pot.

5. The potted plant system of claim 1, further comprising a water level indicator on an outer surface of the outer pot.

6. The potted plant system of claim 1, further comprising of wicks positioned through a bottom of the inner pot.

7. The potted plant system of claim 1, further comprising dispersed apertures within the inner pot providing fluid connectivity between the reservoir and the inner pot.

8. The potted plant system of claim 1, further comprising a quick attach connector providing a connection means between the quick connect sliding valve and a hose.

9. The potted plant system of claim 1, further comprising a water monitor which electronically monitors a water level of the reservoir.

10. The potted plant system of claim 2, further comprising a remotely controlled water supply unit automatically controlling the fluid level within the reservoir through addition and removal of fluid through a water level adaptor.

11. The potted plant system of claim 1 wherein the outer edge channels facilitate efficient water passage of water accumulated on a surface of soil during over the top watering by means of channels positioned on a rim of the inner pot; the channels fluidly connected to the reservoir through a water passage gap positioned between the inner and outer pots;
   wherein, the water which is accumulates on the surface of the soil passively enters the channels on the outer rim of the inner pot and drains into the reservoir through the water passage gap.

12. The potted plant system of claim 11 wherein the channels are sized between 4.0 mm to 15.0 mm.

* * * * *